United States Patent
Nishimura et al.

(10) Patent No.: US 6,381,244 B1
(45) Date of Patent: Apr. 30, 2002

(54) CONNECTIONLESS COMMUNICATION METHOD

(75) Inventors: Takashi Nishimura; Naohide Sekiya; Takeshi Kimura; Hideki Inoue; Hiroshi Nagano; Ikuo Taoka, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/042,979

(22) Filed: Mar. 17, 1998

(30) Foreign Application Priority Data

Oct. 20, 1997 (JP) .............................. 9-287099

(51) Int. Cl.[7] .............................. H04L 12/56
(52) U.S. Cl. ..................... 370/395.21; 370/395.31; 370/395.51
(58) Field of Search ................. 370/395, 396, 370/397, 398, 399, 400, 409, 410, 422, 426, 473, 474, 395.1, 395.2, 395.21, 395.3, 395.31, 395.32, 395.4, 395.41, 395.5, 395.51, 395.52

(56) References Cited

U.S. PATENT DOCUMENTS

| | | | | |
|---|---|---|---|---|
| 5,463,621 A | * | 10/1995 | Suzuki | 370/399 |
| 5,548,589 A | * | 8/1996 | Jeon et al. | 370/399 |
| 5,710,760 A | * | 1/1998 | Moll | 370/249 |
| 5,777,994 A | * | 7/1998 | Takihiro et al. | 370/395 |
| 5,867,481 A | * | 2/1999 | Miyagi | 370/244 |
| 5,892,924 A | * | 4/1999 | Lyon et al. | 709/245 |
| 5,930,259 A | * | 7/1999 | Katsube et al. | 370/409 |
| 6,108,708 A | * | 8/2000 | Iwata | 709/238 |
| 6,137,798 A | * | 10/2000 | Nishihara et al. | 370/392 |
| 6,188,689 B1 | * | 2/2001 | Katsube et al. | 370/389 |

FOREIGN PATENT DOCUMENTS

| | | |
|---|---|---|
| JP | 4230142 | 8/1992 |
| JP | 4138739 | 5/1998 |

* cited by examiner

*Primary Examiner*—Kwang B. Yao
(74) *Attorney, Agent, or Firm*—Rosenman & Colin LLP

(57) ABSTRACT

A plurality of datagram VCCs, each of which is exclusively for connectionless transfer of data, are established between mutually adjacent exchanges in advance, one of these datagram VCCs is assigned exclusively for connectionless data communication and connectionless communication is performed using this datagram VCC. Specifically, an originating terminal disassembles connectionless data into data cells, inserts a cell (a leading cell), which indicates the destination address of a terminal that is the destination of the data, at the head of the data cells and then sends the leading cell to the exchange prior to the data cells. The exchange assigns a prescribed datagram VCC for connectionless communication upon referring to the destination terminal address indicated by the leading cell and thenceforth uses this VCC to transmit data cells having line identifier identical with that of the leading cell.

16 Claims, 37 Drawing Sheets

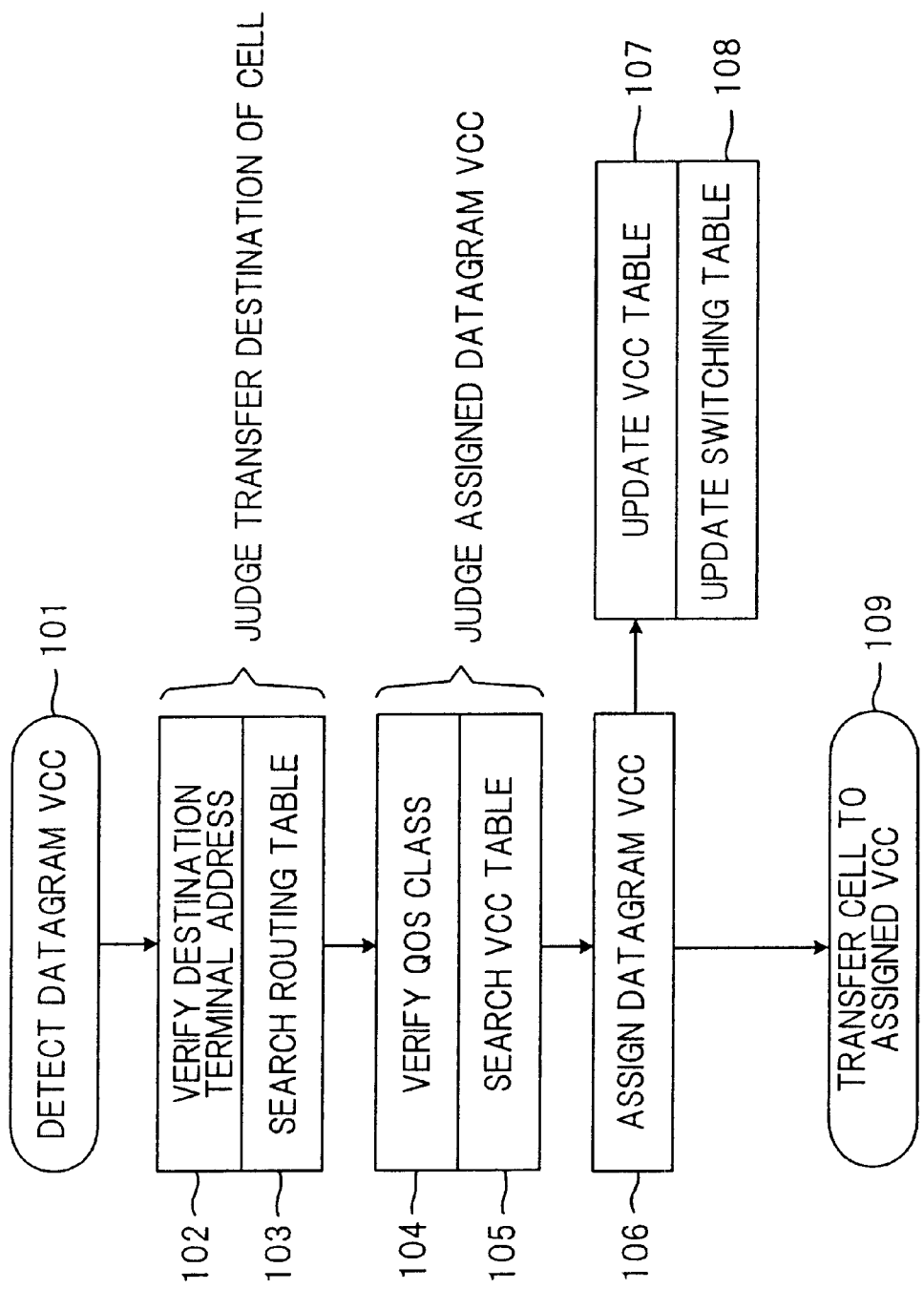

FIG.8A

| VCC NO. | QOS CLASS | SET BANDWIDTH | STATE | NECESSARY QOS | NECESSARY BANDWIDTH | PERSISTENCE | SOURCE | DESTINATION |
|---|---|---|---|---|---|---|---|---|
| VCC3 | 1 | 1.5M | IN USE | 1 | 3M | 1 | A | C |
| VCC4 | 2 | 1.5M | NOT IN USE | | | | | |
| VCC5 | 3 | 1.5M | NOT IN USE | | | | | |

FIG.8B

| INPUT VCC | OUTPUT VCC |
|---|---|
| NOT REGISTERED | NOT REGISTERED |

⇑

| INPUT VCC | OUTPUT VCC |
|---|---|
| VCC1 | VCC3 |

FIG.11A

| VCC NO. | QOS CLASS | SET BANDWIDTH | STATE | NECESSARY QOS | NECESSARY BANDWIDTH | PERSISTENCE | SOURCE | DESTINATION |
|---|---|---|---|---|---|---|---|---|
| VCC3 | 1 | 1.5M | IN USE | 1 | 3M | 1 | A | C |
| VCC4 | 2 | 1.5M | NOT IN USE | | | | | |
| VCC5 | 3 | 1.5M | NOT IN USE | | | | | |

FIG.11B

| VCC NO. | QOS CLASS | SET BANDWIDTH | STATE | NECESSARY QOS | NECESSARY BANDWIDTH | PERSISTENCE | SOURCE | DESTINATION |
|---|---|---|---|---|---|---|---|---|
| VCC3 | 1 | 3M | IN USE | 1 | 3M | 1 | A | C |
| VCC4 | 2 | 1.5M | NOT IN USE | | | | | |
| VCC5 | 3 | 1.5M | NOT IN USE | | | | | |

FIG.11C

| VCC NO. | QOS CLASS | SET BANDWIDTH | STATE | NECESSARY QOS | NECESSARY BANDWIDTH | PERSISTENCE | SOURCE | DESTINATION |
|---|---|---|---|---|---|---|---|---|
| VCC3 | 1 | 3M | IN USE | 1 | 3M | 1 | A | C |
| VCC4 | 2 | 1M | NOT IN USE | | | | | |
| VCC5 | 3 | 0.5M | NOT IN USE | | | | | |

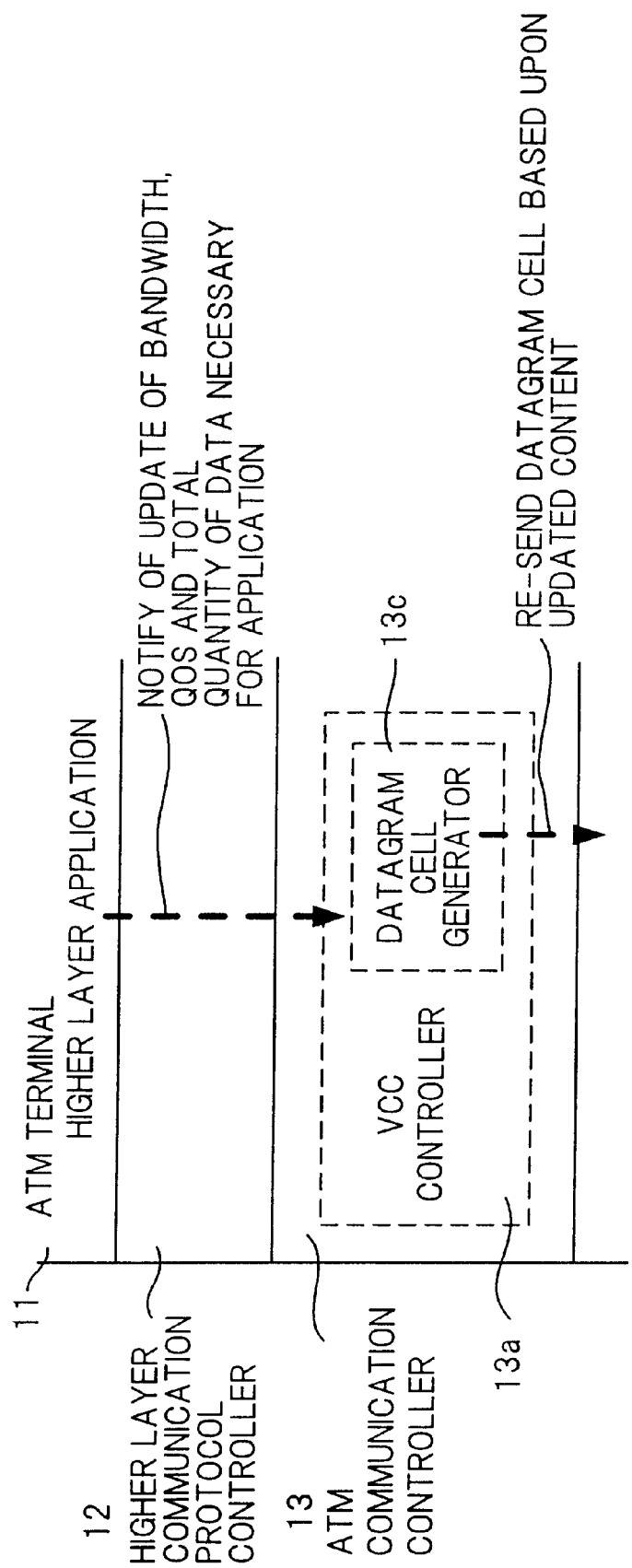

FIG.17A

| VCC NO. | QOS CLASS | SET BANDWIDTH | STATE | NECESSARY QOS | NECESSARY BANDWIDTH | PERSISTENCE | SOURCE | DESTINATION |
|---|---|---|---|---|---|---|---|---|
| VCC3 | 1 | 3M | IN USE | 1 | 3M | 1 | A | C |
| VCC4 | 2 | 1M | NOT IN USE | | | | | |
| VCC5 | 3 | 0.5M | NOT IN USE | | | | | |

22c

| VCC NO. | QOS CLASS | SET BANDWIDTH | STATE | NECESSARY QOS | NECESSARY BANDWIDTH | PERSISTENCE | SOURCE | DESTINATION |
|---|---|---|---|---|---|---|---|---|
| VCC3 | 1 | 1.5M | NOT IN USE | | | | | |
| VCC4 | 2 | 1.5M | NOT IN USE | | | | | |
| VCC5 | 3 | 1.5M | NOT IN USE | | | | | |

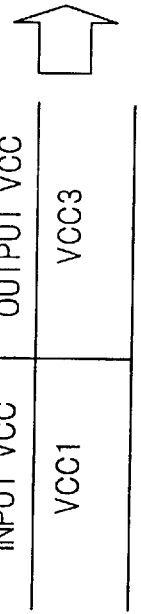

21b

| INPUT VCC | OUTPUT VCC |
|---|---|
| VCC1 | VCC3 |

21b

| INPUT VCC | OUTPUT VCC |
|---|---|
| NOT REGISTERED | NOT REGISTERED |

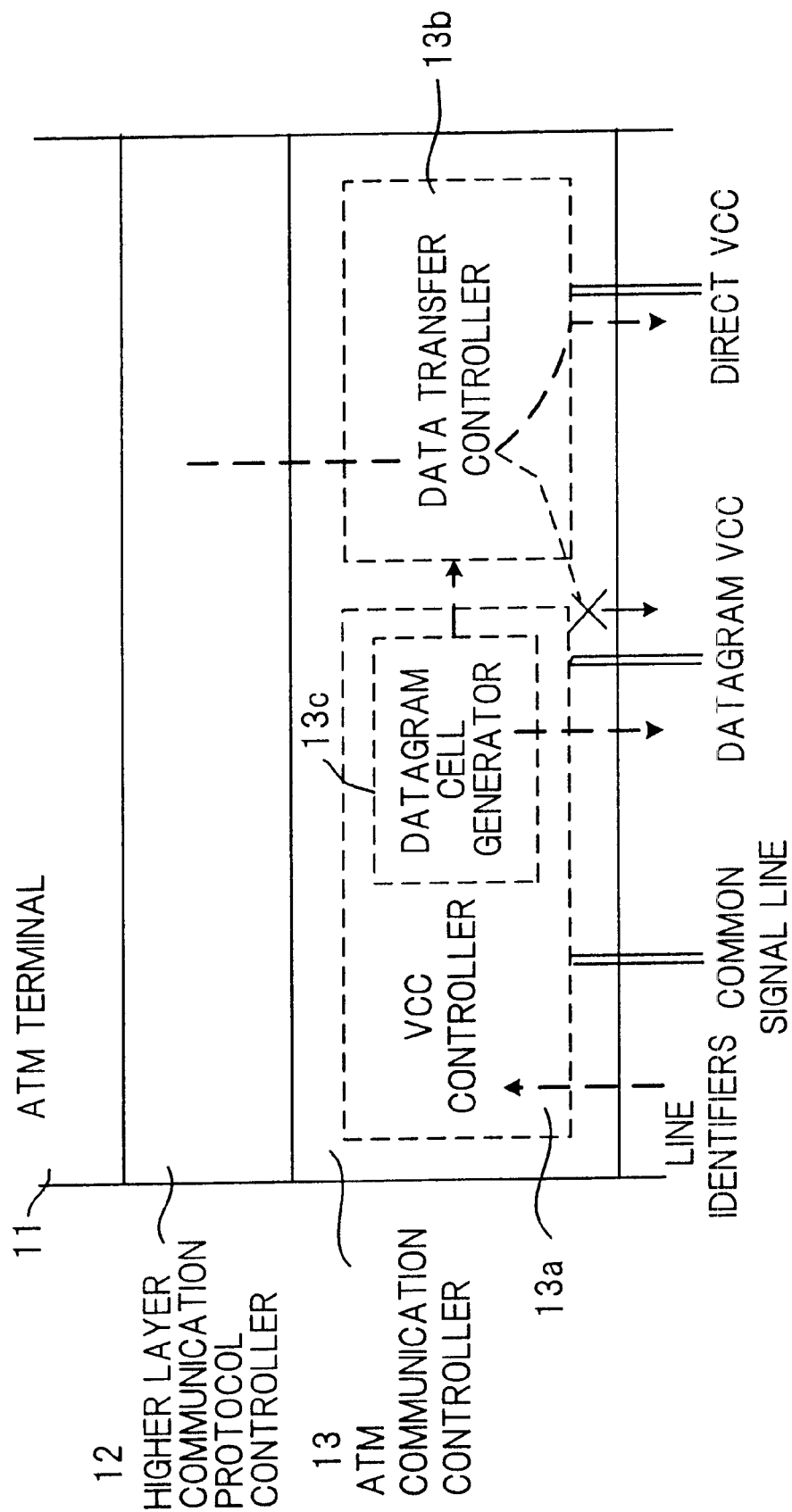

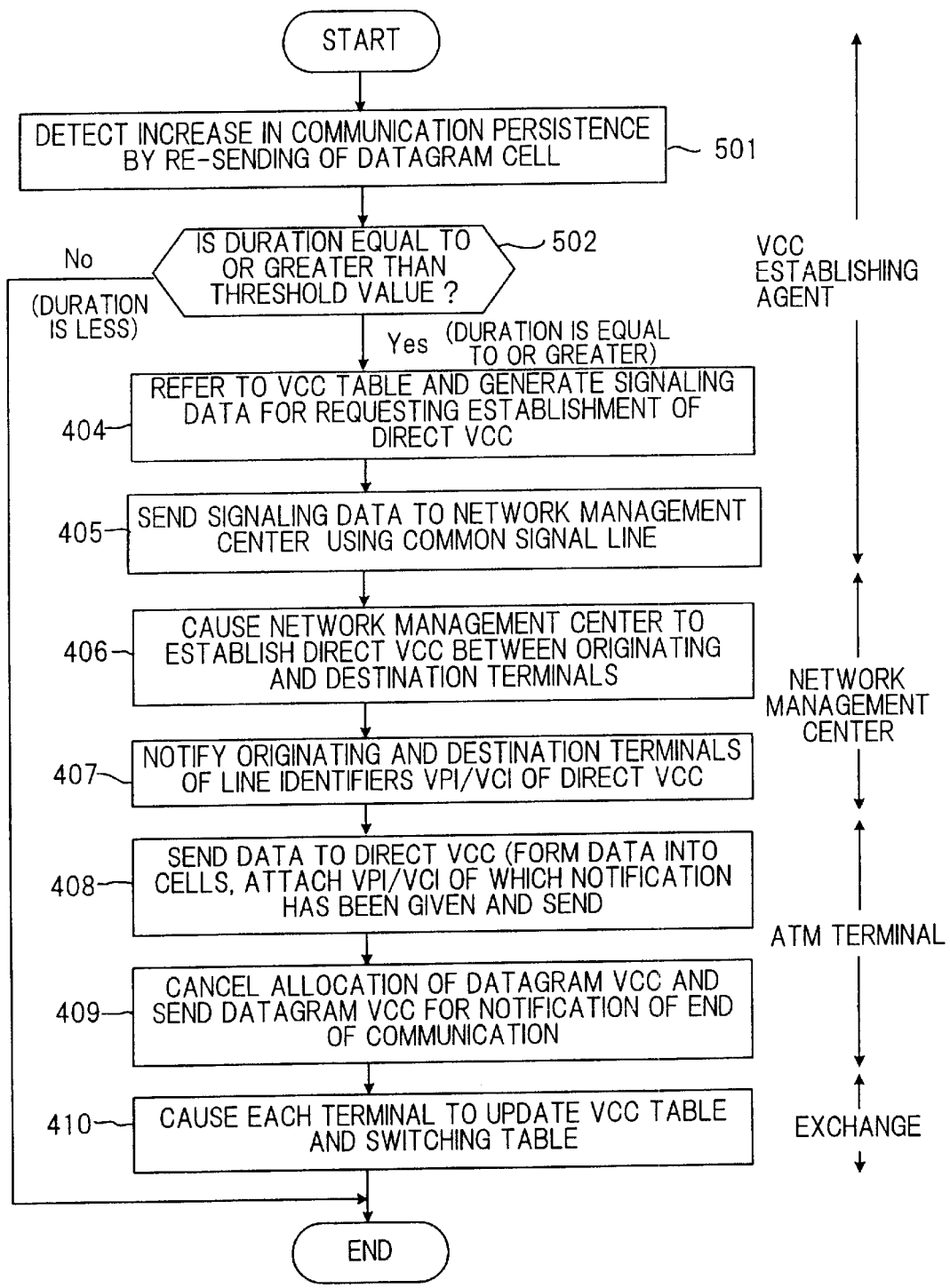

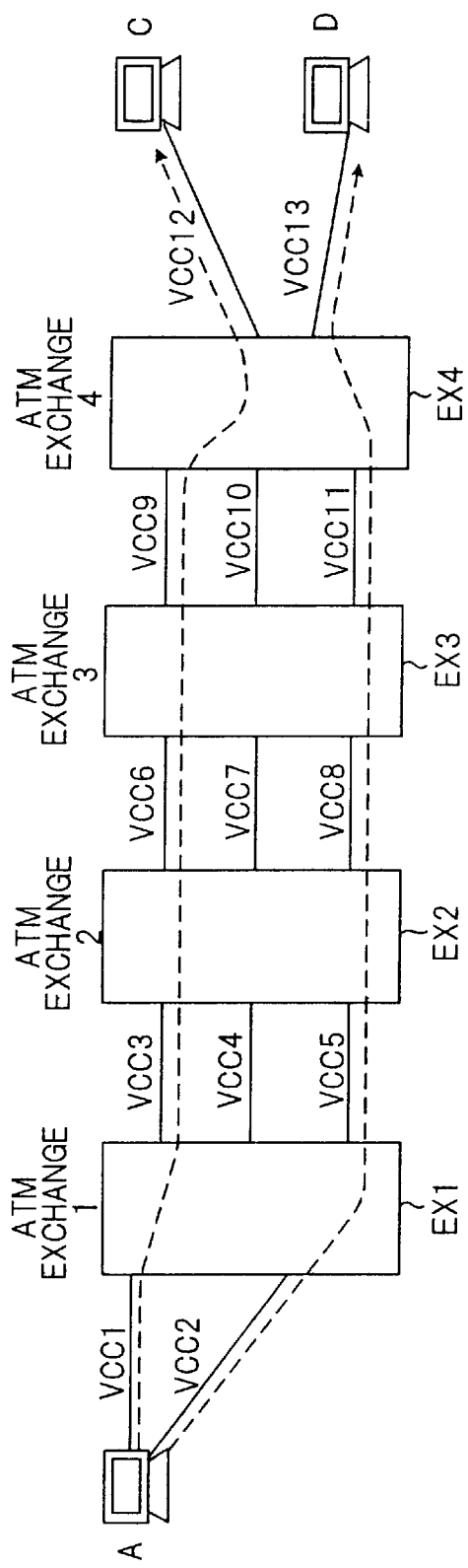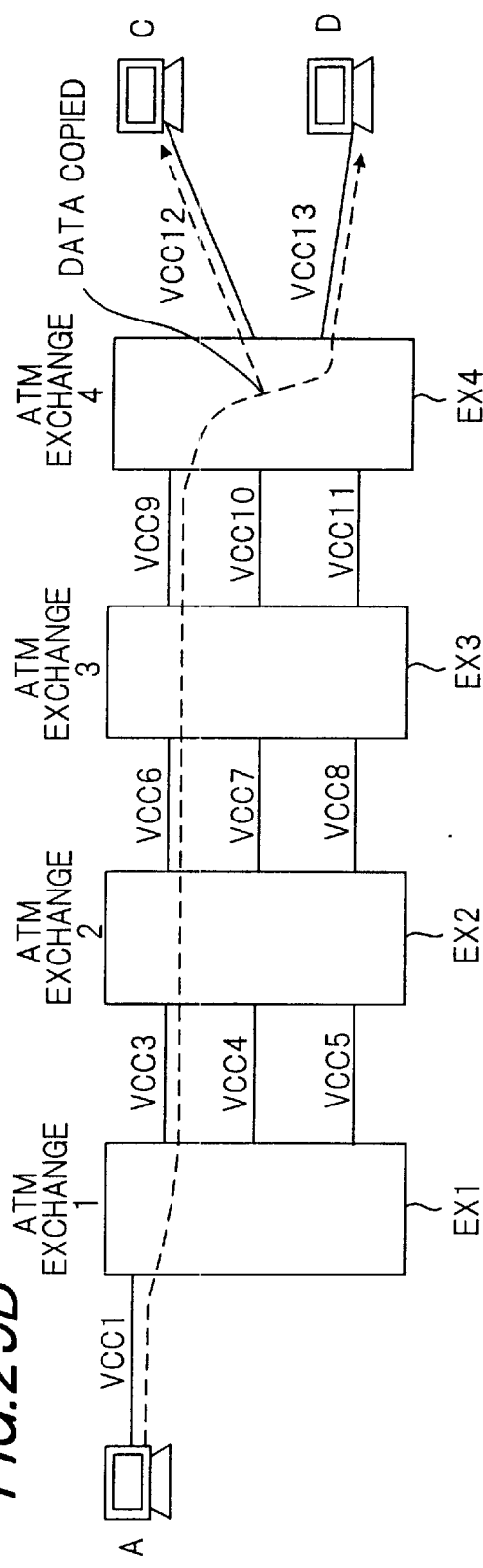

FIG.27A

| INPUT VCC | OUTPUT VCC |
|---|---|
| NOT REGISTERED | NOT REGISTERED |

⇒

| INPUT VCC | OUTPUT VCC |
|---|---|
| VCC1 | VCC3 |

FIG.27B

| INPUT VCC | OUTPUT VCC |
|---|---|
| NOT REGISTERED | NOT REGISTERED |

⇒

| INPUT VCC | OUTPUT VCC |
|---|---|
| VCC9 | VCC12 |

FIG.27C

| INPUT VCC | OUTPUT VCC |
|---|---|
| VCC9 | VCC12 |

⇒

| INPUT VCC | OUTPUT VCC |
|---|---|
| VCC9 | VCC12, VCC13 |

FIG.28A

| VCC NO. | QOS CLASS | SET BANDWIDTH | STATE | NECESSARY QOS | NECESSARY BANDWIDTH | PERSISTENCE | SOURCE | DESTINATION |
|---|---|---|---|---|---|---|---|---|
| VCC3 | 1 | 1.5M | NOT IN USE | | | | | |
| VCC4 | 2 | 1.5M | NOT IN USE | | | | | |
| VCC5 | 3 | 1.5M | NOT IN USE | | | | | |

FIG.28B

| VCC NO. | QOS CLASS | SET BANDWIDTH | STATE | NECESSARY QOS | NECESSARY BANDWIDTH | PERSISTENCE | SOURCE | DESTINATION |
|---|---|---|---|---|---|---|---|---|
| VCC3 | 1 | 1.5M | IN USE | 1 | 1.5M | 1 | A | C |
| VCC4 | 2 | 1.5M | NOT IN USE | | | | | |
| VCC5 | 3 | 1.5M | NOT IN USE | | | | | |

FIG.28C

| VCC NO. | QOS CLASS | SET BANDWIDTH | STATE | NECESSARY QOS | NECESSARY BANDWIDTH | PERSISTENCE | SOURCE | DESTINATION |
|---|---|---|---|---|---|---|---|---|
| VCC3 | 1 | 3M | IN USE | 1 | 3M | 1 | A | C, D |
| VCC4 | 2 | 1M | NOT IN USE | | | | | |
| VCC5 | 3 | 0.5M | NOT IN USE | | | | | |

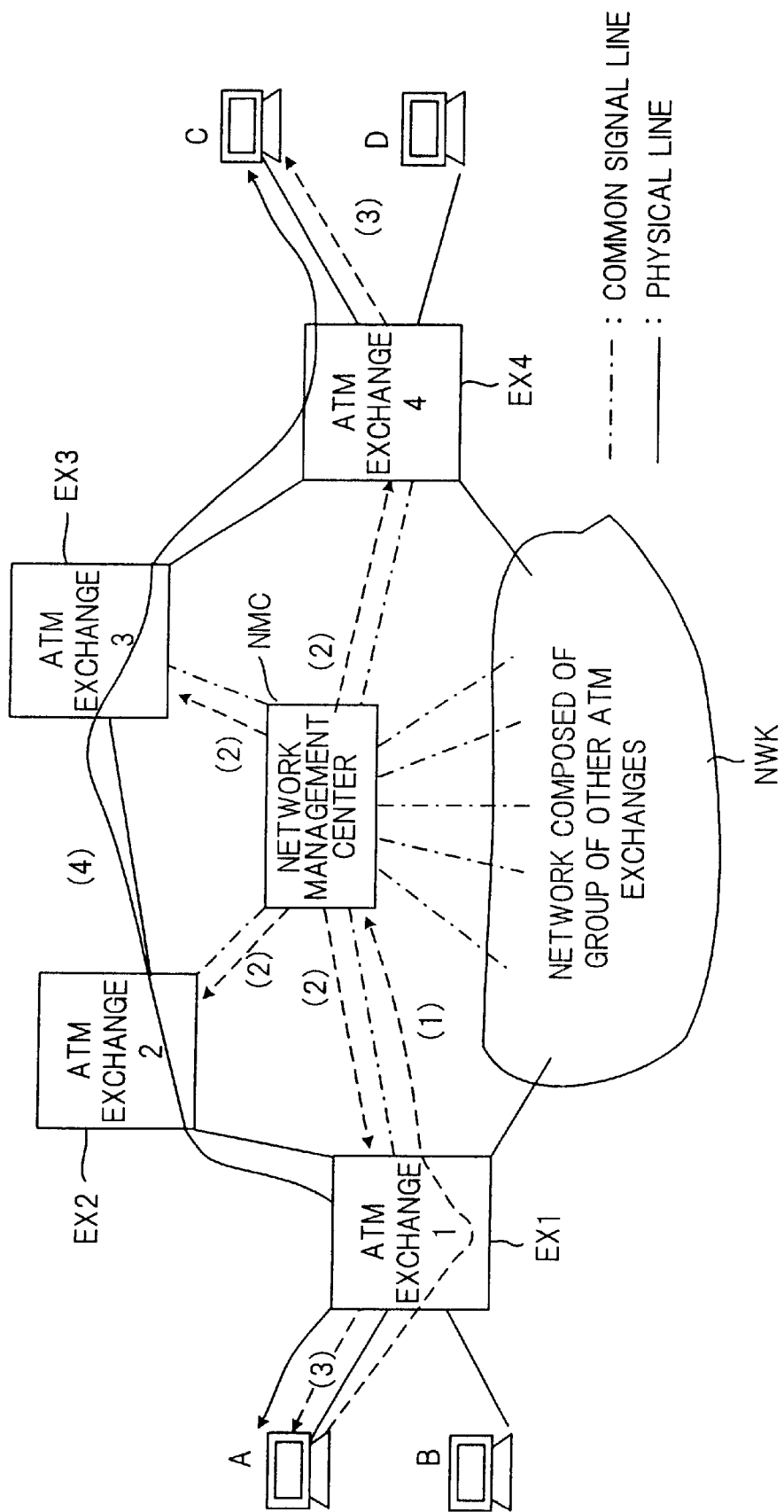

CONNECTIONLESS COMMUNICATION METHOD

BACKGROUND OF THE INVENTION

This invention relates to a connectionless communication method for the connectionless transmission of user data. More particularly, the invention relates to a datagram-type connectionless communication method in which a cell (also referred to as a "leading cell" below) which includes the address of a destination terminal and the like is inserted at the head of a cell stream transferred with an attached prescribed line identifier, and the network transmits a user cell to the destination terminal upon referring to the leading cell.

(a) Connection-oriented Communication and Connectionless Communication

There are two methods of connecting terminals, namely a connection-oriented method and a connectionless method. As shown in FIG. 31A, the connection-oriented communication method involves dialing a number, for example, verifying the transmitting side (A system) and receiving side (B system) prior to the start of communication so as to ring the other party's bell, establishing a path between the two sides and then performing data communication via the established path. This method is advantageous in that reliable communication is possible via a connected line and in that it is simple to transfer information after the connection is established. However, since making the connection takes time, this method is not efficient for the transmission of data of short duration.

The connectionless communication method, on the other hand, as shown in FIG. 31B, involves collecting transmission data into packets, attaching destinations to the packets and then sending the packets to a network, whereupon the network checks the destination of each packet one by one and transmits each packet to the destination terminal. Since making a connection with this method does not take time, even short-duration data can be sent efficiently.

In order to make possible multimedia transmission which includes the transmission of video, ATM (Asynchronous Transfer Mode) technology has been developed in association B-ISDNs and a variety of communication services have been realized. A B-ISDN is capable of providing both connection-oriented and connectionless services.

(b) Connection-oriented Communication in ATM Networks

FIG. 32 is a diagram useful in describing connectionless communication in an ATM network. Shown in FIG. 32 are ATM terminals A~D, ATM exchanges EX1~EX4, a network NWK composed of a group of ATM exchanges, and a network management center NMC. In a case where terminal A is to perform connection-oriented communication with terminal C, the following procedure for establishing a VCC (Virtual Channel Connection) is required:

(1) Terminal A issues a request for communication with terminal C to the network management center NMC via a common signal line (a VCC for signaling).

(2) The network management center NMC responds to the request from terminal A by performing computation to determine that the VCC between the terminals A and C via the ATM exchanges EX1, EX2, EX3, EX4, in the order mentioned, is the most advantageous route, and by instructing each ATM exchange to establish the VCC.

(3) The ATM exchange EX1 notifies terminal A and the ATM exchange EX4 notifies terminal C of line identifiers VPI, VCI used in communication.

(4) Terminal A disassembles data into cells, attaches the line identifiers of which it has been notified to the cells and then sends the cells to the line. Each of the exchanges EX1~EX4 exchanges and transmits the cells while changing the line identifiers of the cells. Terminal C accepts the cells, which have the specified line identifiers, transmitted from the exchange EX4 and assembles the cells into data.

(c) Connectionless Communication in ATM Networks (c-1) Problem Which Arises When Connectionless Communication is Used in ATM Networks The header of an ATM cell contains only virtual line identifiers such as VCI and VPI. That is, the header does not contain an address indicating the destination terminal. Consequently, providing a connectionless communication service such as electronic mail is accompanied with difficulties. For example, if the average downloaded file size on the WWW (Worldwide Web) is two kilobytes and the ATM switch transmits at a rate of 155 megabits per second, then this is the size of a file that can be downloaded in 100 microseconds. However, since an ATM switch requires 10 milliseconds to be connected, 99% is the overhead for the connection. In other words, if an ATM network of the connection-oriented transfer type is used as a transmission path for implementing a connectionless communication service, a delay occurs owing to the time needed to establish the connection.

Solutions to this problem include a PVC (Permanent Virtual Circuit) in the ATM layer and a datagram in a higher layer (e.g., IP layer).

(c-2) PVC Technique

The PVC technique involves establishing end-to-end PVCs beforehand between all of the terminals A~F that are capable of communicating, as shown in FIG. 33. However, this method is disadvantageous in that PVC resources are wasted. In particular, this method cannot be employed in a large-scale network (the Internet, for example) in which communication is performed between an unspecified number of terminals.

(c-3) Datagram Technique

With the datagram technique, as shown in FIG. 34, PVCs (datagram VCCs: VCC1~VCC7) are established beforehand between the terminals A~F and whichever of the exchanges EX1, EX2 is nearest to them, and between the mutually adjacent exchanges EX1 and EX2. An IP packet of a higher layer is assembled from ATM cells by each exchange and switching processing is executed upon observing the terminating-side terminal address that has been entered in the IP packet header. It should be noted that a "datagram" is the unit in which messages are handled in accordance with the IP (Internet Protocol). A datagram technique is a method of providing a destination address in the header of a packet, deciding, on each occasion, the transfer route for each packet and then transmitting the packet.

FIG. 35 is a diagram showing the relationship between an IP packet (IP datagram) and ATM cells. Here P represents an IP packet, which is composed of a header PH and transmission data DT. The header PH includes a variety of information, such as a source address SA and destination address DA. The IP packet P is partitioned into a number of ATM cells $CL_1$~$CL_n$, and a header HD is added onto each cell at the beginning thereof. Line identifiers (VPI/VCI) included in the headers of the cells $CL_1$~$CL_n$ have identical values.

FIG. 36 is a diagram showing the structure of an exchange which implements the conventional datagram approach. Shown in FIG. 36 are an exchange 1, an ATM switch unit 2, and an IP router 3. (1) A switching able 2a of the ATM switch unit 2 stores the correspondence between the input line identifiers (input VPI/VCI) and output line identifiers (output VPI/VCI), and an ATM switch 2b generally switches a cell, which arrives from the VCC, to a prescribed route based upon the content of the switching table 2a. (2) If a cell arrives from a datagram VCC, the ATM switch unit 2b delivers this cell to the IP router 3. A packet assembler 3a in the IP router 3 assembles ATM cells into an IP packet and delivers the IP packet to a routing controller 3c. (3) A routing table 3b stores the correspondence between terminal addresses and output-destination datagram VCCs. Accordingly, the routing controller 3c refers to the routing table 3b to obtain an output-destination datagram VCC that corresponds to a destination terminal address indicated by the header of the entered IP packet and notifies the ATM switch 2b to perform the switching of one packet.

In this datagram approach involving a higher layer (the IP layer), it is required that the above-mentioned processing operations (2) and (3) be performed whenever a cell arrives from the datagram VCC. An additional problem is that assembling the packet in step (2) above takes time.

Another problem is that the bandwidth of the line is exceeded or that the quality of the communication service cannot be assured. FIG. 37 is a diagram useful in describing this problem. This illustrates a case in which data is transmitted from terminal A to terminal E and from terminal B to terminal F by the datagram method (connectionless communication). An output-destination datagram VCC (VCC4) has been stored in the routing table 3b of the exchange EX1 in correspondence with the terminal addresses of the terminating-side terminals E, F, as shown in FIG. 36. Accordingly, a cell destined for terminal E arriving from the terminal A via the datagram VCC (VCC1) is sent to the output-destination datagram VCC (VCC4). Similarly, a cell destined for terminal F arriving from the terminal B via the datagram VCC (VCC2) is sent to the datagram VCC (VCC4). Though not shown, all datagram VCCs (VCC4) are allocated to cells addressed to terminals accommodated by the exchange EX2 from other terminals accommodated by the exchange EX1. Consequently, the bandwidth of the line LNG is exceeded or the quality of the communication service cannot be assured.

More specifically, since the datagram scheme requires IP layer switching at each exchange, a problem which arises is that the high-speed capability of the ATM switch cannot be manifested fully. Further, with the datagram scheme, one datagram VCC (VCC4) established between the exchanges EX1 and EX2 (FIG. 37) is used arbitrarily by a plurality of connectionless communication operations at the same time, as a consequence of which communication quality and the bandwidth necessary for persistence of communication cannot be assured. This means that this method is not suited to communication at a constant bit rate, which requires a real-time capability.

The cut-through method using an ATM switching unit is available as a solution to the above-mentioned problem encountered with the datagram method. FIG. 38A is a diagram useful in describing cut-through. Shown in FIG. 38A are the exchanges (IP switches) EX1~EX3, the ATM switch unit 2 and the IP router 3. Ordinarily, an IP packet is assembled from ATM cells that have arrived via the datagram VCC (shared VCC) and switching is performed based upon the destination IP address, as described earlier with reference to FIG. 36. With cut-through, however, a special-purpose ATM connection (VCC) between terminals A and E is established between the IP switches EX1, EX2 during the course of communication, and communication between the terminals A and E is performed via this VCC. As a result, route selection by the IP router 3 is made unnecessary and cut-through (a short cut) via the ATM switch unit 2 is achieved to realize higher speed.

An opportunity to use cut-through is when a terminal sends a packet required by an RSVP (resource reservation Protocol). The RSVP is a higher layer protocol than the Internet Protocol and demands bandwidth necessary for continuation of communication. By adopting this approach, the IP switch (exchange) is capable of ascertaining the required bandwidth and establishes the special-purpose VCC between the terminals A and E at the required bandwidth, thereby assuring the acquisition of the bandwidth necessary for continuation of communication. In other words, as shown in FIG. 38B, (1) switching usually is performed via the IP router. (2) When a packet demanded by the RSVP is detected, the required bandwidth is verified and the short-cut VCC is established at this bandwidth.

However, cut-through is merely an attempt to speed-up processing by the IP switch and assure the necessary bandwidth; it does not necessarily make possible the efficient utilization of network resources. For example, even if the IP switch is cut through, the route is still that decided by the IP router. When viewed from the end-to-end terminals, this route is not necessarily the shortest. In addition, in a case where the necessary bandwidth cannot be acquired with the route decided by the IP router, another route cannot be selected.

SUMMARY OF THE INVENTION

Accordingly, an object of the present invention is to make possible high-speed connectionless communication utilizing fully the high-speed switching characteristics of an exchange, e.g., an ATM exchange, for connection-oriented communication.

Another object of the present invention is to make possible datagram-type connectionless communication by inserting a datagram cell (leading cell), which indicates the address of the destination terminal, the necessary bandwidth desired by the terminal and the quality of service, at the head of a cell stream.

Another object of the present invention is to arrange it so that a network decides the shortest route and acquires the network resources necessary for persistence of communication and maintenance of communication quality while communication is being supported over route that has been decided by the datagram method.

A further object of the present invention is to arrange it so that a variety of protocols are handled by making it possible to identify which protocol address is specified by an address indicated by a datagram cell (leading cell).

Yet another object of the present invention is to notify a network of the latest required particulars and carry out communication conforming to the latest required particulars in a case where the necessary bandwidth and QOS (Quality of Service) class required by a terminal are changed during the course of communication.

Still another object of the present invention is to restore an assigned VCC to a not-in-use state in response to the end of communication (connectionless communication) based upon the datagram approach, thereby making it possible to utilize this VCC again for the purpose of another connectionless communication operation.

Another object of the present invention is to so arrange it that when a physical line which includes an assigned VCC does not have enough surplus bandwidth to satisfy a bandwidth of the same class, communication which satisfies the necessary bandwidth and QOS demanded by a terminal can be performed over a direct route separate from a communication route based upon the datagram approach.

Another object of the present invention is to so arrange it that when persistence (duration) of communication is managed and a datagram VCC for which persistence exceeds a certain threshold value exists, communication which meets the requirements demanded by a terminal can be performed over a direct route separate from a communication route based upon the datagram approach, thereby preventing lack of standby datagram VCCs in order to perform communication that continues over an extended period of time.

A further object of the present invention is to avoid duplication of direct VCC establishment requests to a network management center by arranging is so that an exchange which issues a direct VCC establishment request to the network management center is made only the exchange that accommodates the originating terminal.

A further object of the present invention is to lighten the load upon the originating terminal and suppress an increase in traffic in datagram-type multicast communication.

In accordance with the present invention, the foregoing objects are attained by providing a connectionless communication method for the connectionless transmission of data, comprising the steps of (1) establishing a plurality of VCCs (Virtual Channel Connections), each of which is exclusively for connectionless transfer of data, between mutually adjacent exchanges beforehand, (2) assigning one of the VCCs exclusively for connectionless data communication between terminals, and (3) performing connectionless data communication using this one VCC.

In accordance with the present invention, the foregoing objects are attained by providing a connectionless communication method for the connectionless transmission of data which further comprises the steps of (4) causing a terminal to disassemble connectionless data into data cells and then send the data cells, (5) causing the terminal to insert a cell (leading cell), which indicates a destination terminal address of a terminal that is the destination of the data, at the head of the data cells and send the leading cell prior to the data cells, (6) causing an exchange to assign a prescribed VCC for communication of the above-mentioned connectionless data upon referring to the destination terminal address contained in the leading cell, and (7) causing the exchange to transmit data cells, which have line identifier identical with that of the leading cell, using the VCC that has been assigned.

Other features and advantages of the present invention will be apparent from the following description taken in conjunction with the accompanying drawings.

BRIEF DESCRIPTION OF THE DRAWINGS

FIG. 7 is flowchart illustrating the operation of the exchange;

FIGS. 8A and 8B are diagrams useful in describing the content of tables;

FIGS. 11A, 11B and 11C are diagrams useful in describing the content of a VCC table;

FIG. 12 is a diagram useful in describing the operation of ATM terminal when a request is changed;

FIGS. 17A and 17B are diagrams useful in describing the content of various tables;

FIG. 21 is a diagram useful in describing communication control of a terminal based upon a direct VCC;

FIG. 22 is a flowchart of processing for establishing a direct VCC and for performing communication control (for increasing communication persistence);

FIGS. 25A and 25B are diagrams useful in describing multicast communication;

FIGS. 27A, 27, and 27C are diagrams useful in describing the content of switching tables;

FIGS. 28A, 28B and 28C are diagrams useful in describing the content of a VCC table of datagram VCCs addressed from exchange EX1 to exchange EX2;

FIG. 32 is a diagram useful in describing connection-oriented communication;

DESCRIPTION OF THE PREFERRED EMBODIMENT

(A) Principle of the Present Invention

Figure 1:
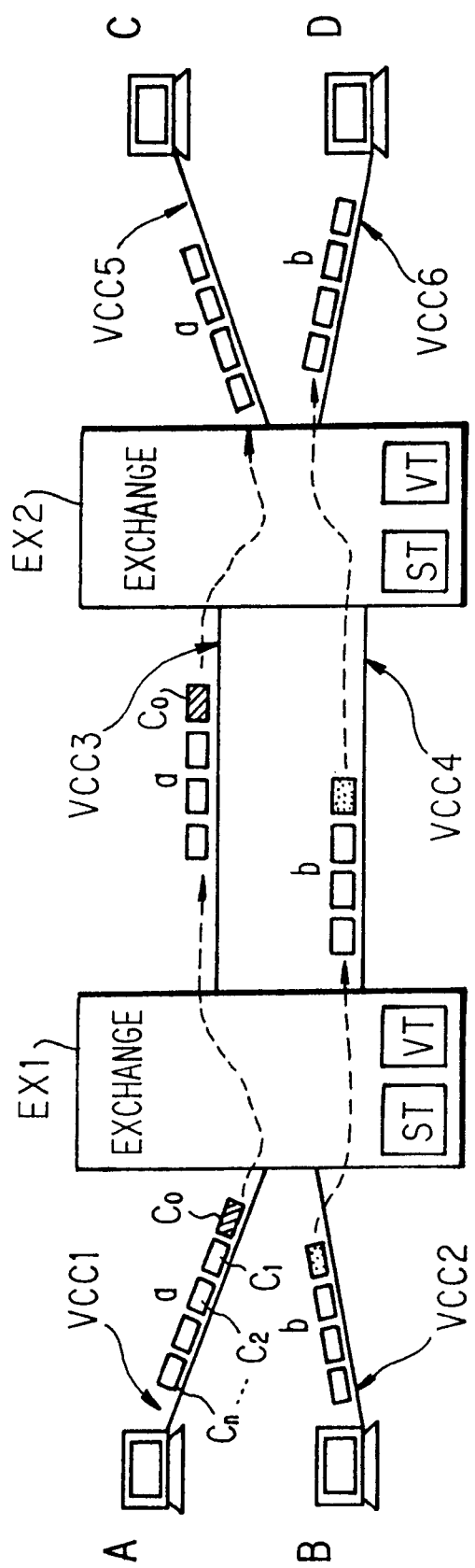
FIG. 1 is a diagram useful in describing an overview of a communication system according to the present invention.
Figure 2:
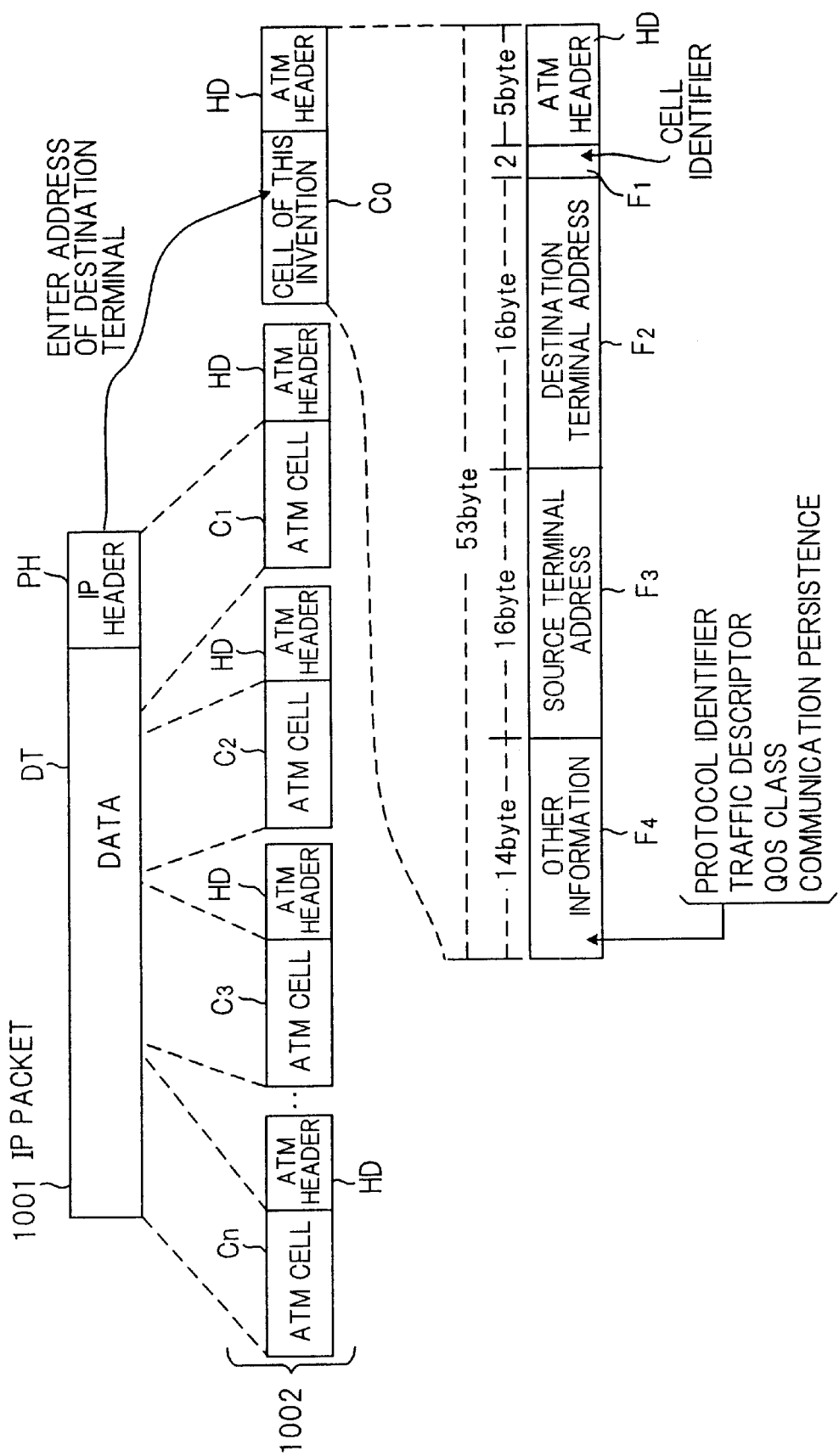
FIG. 2 is a diagram useful in describing the relationship between an IP packet and ATM cells.

FIGS. 1 and 2 are diagrams useful in describing the principle of the present invention, in which FIG. 1 is an overview of a communication system and FIG. 2 illustrates the relationship between an IP packet and ATM cells.

Shown in FIG. 1 are terminals A, B, C, D and ATM exchanges EX1 and EX2. Further, VCC1 is a datagram VCC between the terminal A and the exchange EX1, VCC2 a datagram VCC between the terminal B and the exchange EX1, VCC3 and VCC4 datagram VCCs between the exchanges EX1 and EX2, VCC5 a datagram VCC between the terminal C and the exchange EX2, and VCC6 a datagram VCC between the terminal D and the exchange EX2. Further, ST represents a switching table storing data which decides the switching paths of cells, and VT represents a VCC table which manages datagram VCCs.

Figure 35:
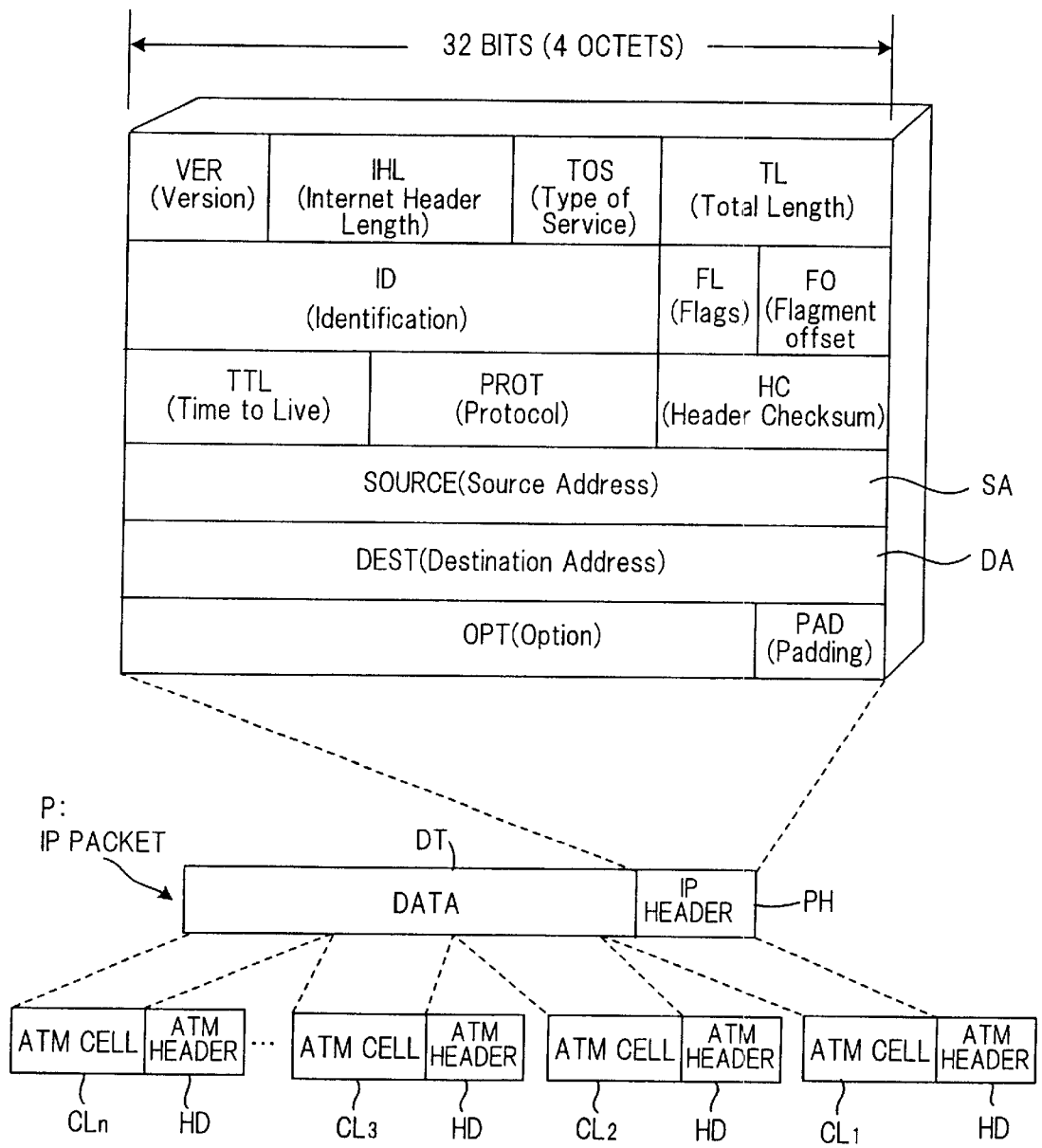
FIG. 35 is a diagram showing the relationship between an IP packet and ATM cells according to the prior art.
Figure 36:
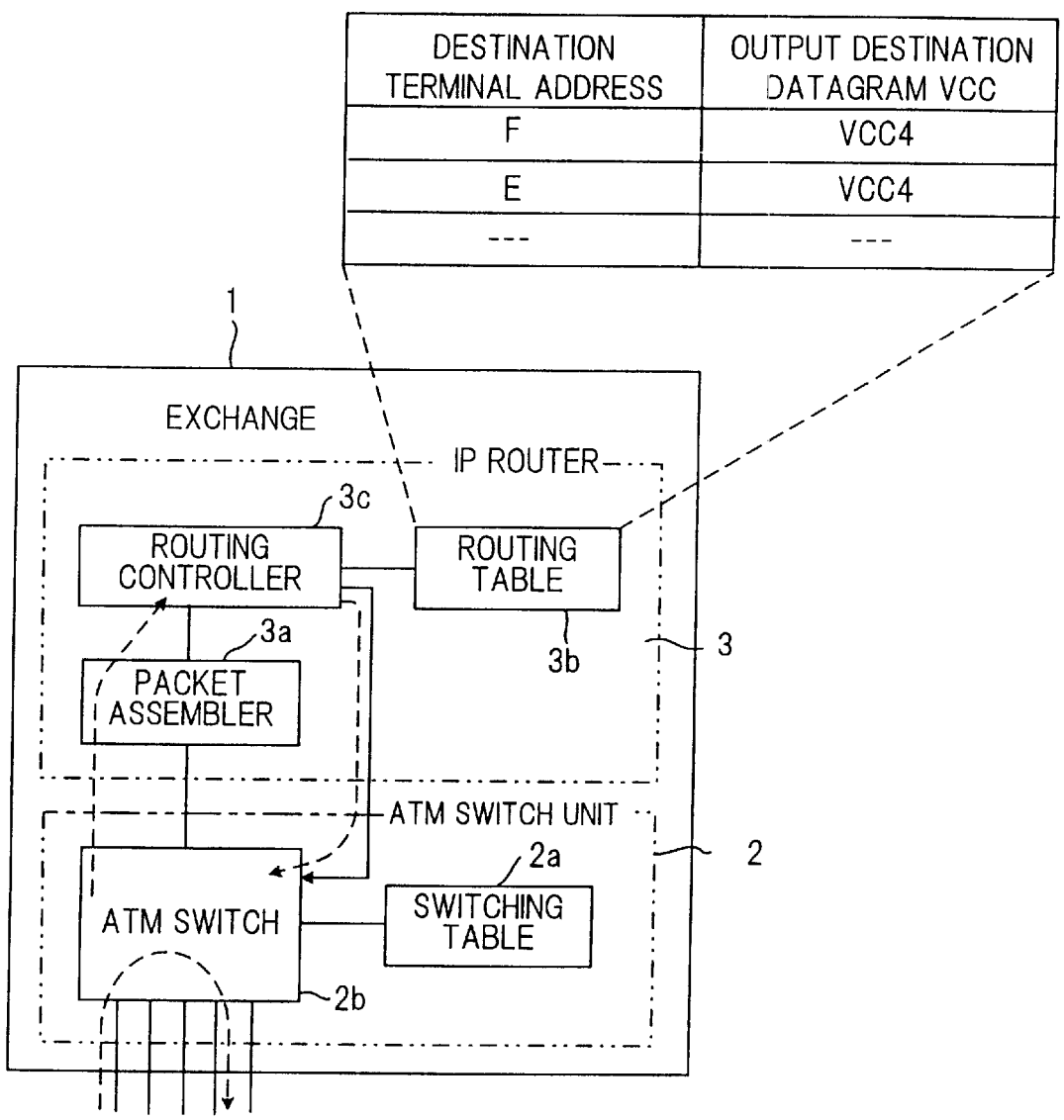
FIG. 36 is a diagram showing the construction of an exchange which implements the conventional datagram method.
Figure 37:
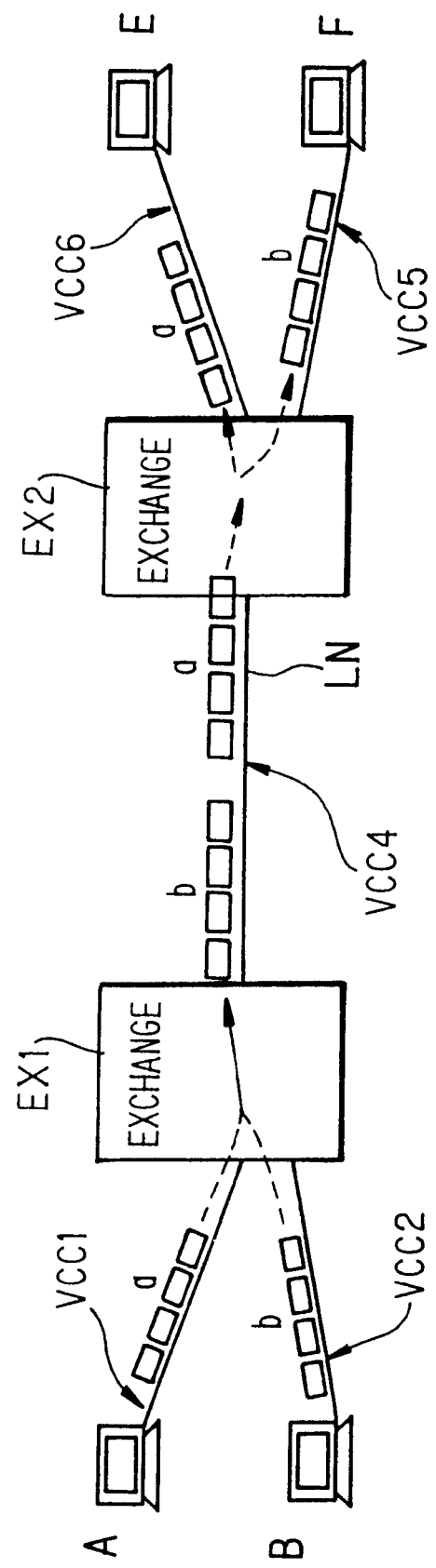
FIG. 37 is a diagram useful in describing a conventional method in a case where data is communicated from a terminal A to a terminal E and from a terminal B to a terminal F.

An IP packet 1001 and an ATM cell group 1002 are shown in FIG. 2. The IP packet 1001 is composed of a header PH and transmission data DT. The header PH includes a variety of information, such as a source address SA and destination address DA (see FIG. 35). The IP packet 1001 is partitioned into a number of ATM cells $CL_1 \sim CL_n$, and an ATM header HD is added onto each cell. A datagram cell (also referred to as a "leading cell") $C_0$, in which the address of the destination terminal has been entered, is inserted at the head of the ATM cells $CL_1 \sim CL_n$. The payload of the leading cell has (1) a field F1 in which a 2-bit cell identifier ID, which indicates that the cell is a datagram cell, is entered, (2) a field F2 in which a destination terminal address DA is entered, (3) a field F3 in which an originating terminal (source terminal) address SA is entered, and (4) a field F4 in which a protocol identifier, traffic descriptor (necessary bandwidth), quality of service (QOS) and communication persistence, are entered.

(a) A plurality of VCCs [datagram VCCs (VCC3, VCC4)], which are exclusively for connectionless transfer of data, are established between the exchanges EX1 and EX2 in advance, one datagram VCC is assigned to connectionless data communication, and connectionless data communication is performed using this datagram VCC. More specifically, in a case where the originating terminal A transmits data to the terminal C, the connectionless data (IP packet 1001) is disassembled into the cells $C_1 \sim C_n$, the cells $C_1 \sim C_n$ are sent to the datagram VCC (VCC1), and the datagram cell (leading cell) $C_0$, which indicates the address of the cell C that is the destination of the data, is sent to the exchange EX1 upon being inserted at the head of the cells $C_1 \sim C_n$. The exchange EX1 refers to the destination terminal address indicated by the leading cell $C_0$, assigns a prescribed output-side datagram VCC (VCC3) for connectionless communication of the data and thenceforth transmits the data cells $C_1 \sim C_n$, which have line identifiers (VPI/VCI) identical with those of the leading cell, via the datagram VCC (VCC3). In this case the exchange EX1 stores the correspondence between line identifiers of the leading cell $C_0$ and the line identifiers of the datagram VCC (VCC3) in the switching table ST, refers to the switching table and transmits the data cells $C_1 \sim C_n$, which have line identifiers identical with those of the leading cell $C_0$, via the datagram VCC (VCC3) that has been assigned. Similarly, the exchange EX1 assigns a datagram VCC (VCC4) for connectionless communication of data from the originating terminal B to the terminal D.

If this arrangement is adopted, exchanges for connection-oriented communication, e.g., the ATM exchanges EX1 and EX2, need not assemble ATM cells into an IP packet, thus making possible connectionless communication in which the high-speed switching characteristic of the ATM exchanges is exploited fully. Further, since a plurality of datagram VCCs are provided between the exchanges, communication can be carried out by assigning a single prescribed datagram VCC for each connectionless communication operation. This makes possible connectionless communication that meets the bandwidth and QOS requirements of the terminal.

(b) A protocol identifier, which identifies which protocol address is specified by a destination terminal address, is included in the leading cell $C_0$, whereby each of the exchanges EX1, EX2 is capable of identifying, by referring to the protocol identifier, which protocol address is specified by the terminal address indicated by the leading cell $C_0$. If this arrangement is adopted, not only the Internet Protocol but various other higher layer protocols can be supported.

(c) Data indicating bandwidth or quality of service class (QOS class) required for connectionless communication is included in the leading cell $C_0$, and the exchanges EX1, EX2 are made to manage, by a VCC table VT, in-use/not-in-use state of each datagram VCC and bandwidths or QOS classes set for datagram VCCs. If this arrangement is adopted, the exchanges EX1, EX2 can, by referring to the VCC table VT, assign a datagram VCC having the necessary bandwidth or QOS class indicated by the leading cell.

(d) In a case where a datagram VCC that satisfies the necessary bandwidth or QOS class requested by an originating terminal does not exist between the exchange EX1 and the exchange EX2, the exchange EX1 starts communication by temporarily assigning a datagram VCC that does not satisfy the necessary bandwidth or QOS class. Then, during the course of communication, the exchange EX1 raises the set bandwidth or QOS class of the assigned VCC up to the bandwidth or QOS class required by the terminal. If the physical line over which the assigned datagram VCC exists does not have enough surplus bandwidth to attain the necessary bandwidth in this case, the exchange EX1 checks to determine whether an unused datagram VCC exists in this line. If such a datagram VCC exists, then the exchange EX1 reduces the set bandwidth of the unused VCC to obtain the necessary bandwidth. If this arrangement is adopted, communication can be started immediately even in a case where a datagram VCC that satisfies the necessary bandwidth or QOS class demanded by a terminal does not exist. Moreover, communication which meets the needs of the terminal can be performed after the start of communication.

(e) When the necessary bandwidth or QOS class changes during communication using an assigned datagram VCC, the terminal transmits a datagram cell (a request-change cell) to the exchange in order to notify the exchange of the change in necessary bandwidth or QOS class. Upon receiving the request-change cell, the exchange, rather than executing routing processing, executes only processing for altering the set bandwidth of the already assigned datagram VCC to the necessary bandwidth. If this arrangement is adopted, the exchange is freed from execution of routing processing, as a result of which the load is reduced. Moreover, communication that satisfies requirements after a change can be performed.

(f) When connectionless communication using a datagram VCC ends, the terminal sends the exchange a datagram cell (communication-end notification cell) indicative of end of communication, and the exchange responds to the communication-end notification cell by restoring the assigned datagram VCC to a not-in-use state. As a result, a datagram VCC can be utilized again for another connectionless communication.

(g) When the necessary bandwidth or QOS class changes during communication using an assigned datagram VCC and the physical line that includes this datagram VCC does not have enough surplus bandwidth to increase the set bandwidth to the necessary bandwidth, the exchange requests the network management center to establish a direct VCC between terminals and causes execution of communication between the terminals via a direct route that differs from the route based upon the already assigned datagram VCC. This makes possible communication that positively satisfies requirements after a change.

(h) Data indicative of communication persistence is included in a leading cell and an exchange manages communication persistence of each datagram VCC by a VCC table. If communication persistence exceeds a predetermined threshold value, the exchange requests the network management center for establishment of a direct VCC between terminals and causes execution of communication between the terminals via a direct route that differs from the route based upon the already assigned datagram VCC. If this expedient is adopted, it is possible to prevent lack of standby datagram VCCs in order to perform communication that continues over an extended period of time.

(i) An exchange which sends the network management center a request to establish a direct VCC is made the exchange directly accommodating the originating terminal. An exchange located along the route sends the exchange directly accommodating the above-mentioned originating terminal a bandwidth deficiency notification cell indicative of insufficient bandwidth. As a result of this arrangement, only one exchange requests the network management center to establish a direct VCC, thus making it possible to avoid duplication of direct VCC establishment requests.

(j) In case of multicast communication, an originating terminal continuously transmits leading cells the number of which is equivalent to the number of terminals of the other parties. Upon receiving a leading cell, an exchange determines the destination switch by referring to the destination terminal address indicated by the leading cell. If this switching destination does not duplicate the prevailing switching destination, then the exchange assigns a prescribed VCC and registers the correspondence between the line identifiers of the leading cell and the line identifiers of the assigned VCC in the switching table. As a result of this arrangement, cells are sent via a common path up to a branch point and the cells are copied at the branch point and then distributed to the destination terminals. This lightens terminal load and suppresses an increase in traffic in multicast communication.

(B) Overview of the Present Invention (a) ATM-based Datagram Service

In the prior-art example of communication using the datagram technique, switching cannot be performed in the ATM layer and is required to be performed in the higher IP layer. The reason is as follows: The line identifiers VPI and VCI for the switching of an ATM cell are assigned on a per-VCC basis when the VCC (connection) is established. With the datagram approach (connectionless communication approach), therefore, in which no VCC is established, a certain single VPI, VCI is shared in any communication between terminals. Consequently, according to the datagram service, the destination to which an ATM cell is to be transferred cannot be judged merely by scrutinizing the line identifiers (VPI/VCI) that have been entered in the ATM header of the cell. Accordingly, with the datagram service, it is necessary to decide the transfer destination by reassembling the ATM cells into an IP packet and reading the IP address of its destination terminal.

In order to perform IP layer switching, however, the ATM cells must be reassembled into an IP packet and the reassembly takes considerable time. This makes it impossible to manifest the capability of ATM switches.

Accordingly, with the connectionless communication method of the present invention, the arrangement is such that when an originating terminal starts sending data to another party's terminal in the form of ATM cells, the datagram cell (leading cell) $C_0$ indicating the address (IP address) of the destination terminal is attached to the head of the cell stream, as shown in FIG. 2, and the cell stream and leading cell are sent to the exchange. As a result, the exchanges EX1, EX2 (FIG. 1) need not reassemble the ATM cells into an IP packet and are capable of deciding the transfer destination of the cell stream (the overall IP packet) at the stage at which the leading cell $C_0$ is received. More specifically, each exchange refers to the destination terminal address indicated by the leading cell $C_0$, assigns the prescribed datagram VCC for the purpose of connectionless communication and thenceforth transmits, via this datagram VCC, the data cells $C_1 \sim C_n$ having line identifiers identical with those of the leading cell $C_0$.

Further, with the connectionless communication method of the present invention, a plurality of datagram VCCs are provided beforehand between the exchanges EX1 and EX2 and one of these datagram VCCs is assigned to a respective one of connectionless communication operations. This makes it possible to perform connectionless communication that furnishes the bandwidth and QOS requested by a terminal through use of the leading cell. Thus, in accordance with the connectionless communication method of the present invention, cut-through is achieved by a special-purpose datagram VCC from the initial change of communication.

(b) Change to Optimum Route

Figure 38A:
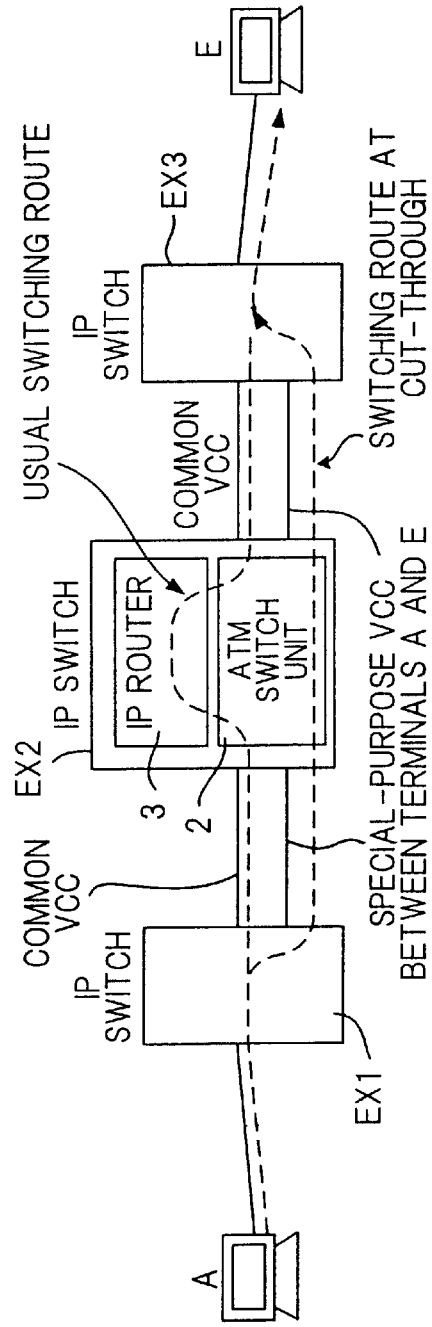
FIGS. 38A and 38B are diagrams useful in describing a short-cut.
Figure 38B:
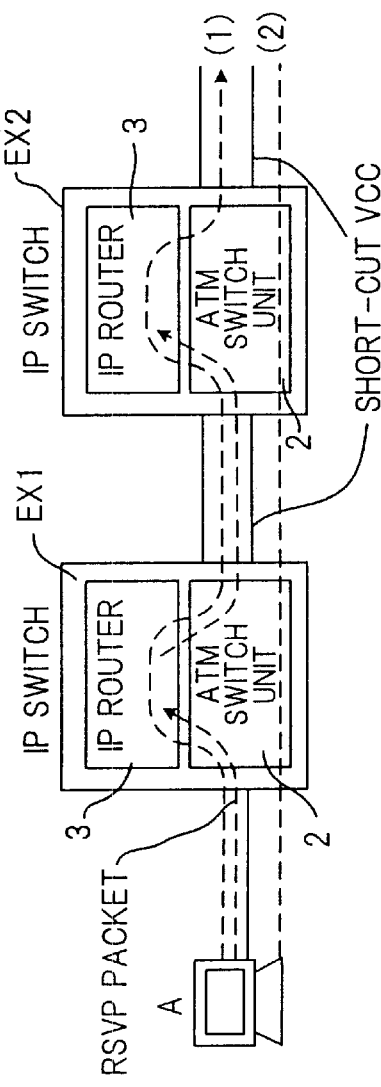

With the conventional IP switch approach, the opportunity to use cut-through at an ATM switch unit is when a terminal has sent an RSVP packet, as shown in FIG. 38. There are three reasons for this. Specifically, (1) a large quantity of data generally does not flow at the initial stage of communication. (2) A constant bit-rate (CBR) application requiring the assurance of a necessary bandwidth and QOS usually is started up in the second stage of communication. (3) The terminal is incapable of correctly ascertaining the necessary bandwidth, QOS and persistence of communication at the initial stage, which is when the aforementioned CBR applications have not yet been started up.

If this approach were to be applied to the connectionless communication method of the present invention, information such as the necessary bandwidth and QOS entered in the leading cell $C_0$ of the present invention would be inaccurate.

Accordingly, the connectionless communication method of the present invention is so adapted that when information such as the necessary bandwidth and QOS has changed, the terminal sends the exchange a datagram cell (the aforesaid request-change cell) that is for changing the request, whereby the exchange is notified of the latest request. Upon receiving the request-change cell, the exchange, rather than executing routing processing, raises the set bandwidth and QOS of the already assigned datagram VCC to the necessary bandwidth and QOS that have been requested. In a case where the physical line in which the already assigned datagram VCC resides cannot assure the necessary bandwidth and QOS, the network management center responds to a request from the exchange accommodating the originating terminal by establishing a direct VCC between end-to-end terminals and providing this VCC to the terminal as a new route.

The method of assuring the route to the destination terminal is the same as that for establishing the VCC of connection-oriented communication in an ordinary ATM exchange network. Thus, in a case where a terminal requests connectionless communication, the present invention, while assuring the initial stage of communication with the datagram approach, establishes in the meantime a datagram VCC, which meets the requirements of the terminal, between end-to-end terminals and supplies this VCC to the terminal.

(C) Embodiment (a) Network Configuration

Figure 3:
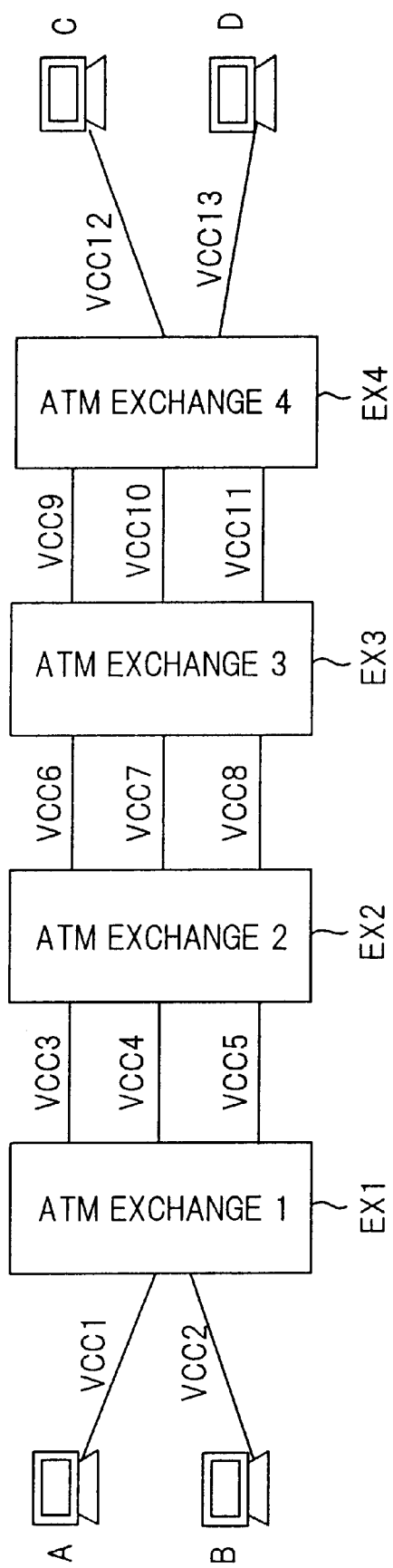
FIG. 3 is a diagram showing the configuration of a network which performs connectionless communication according to the present invention.

FIG. 3 is a diagram showing the configuration of a network which performs connectionless communication according to the present invention. The network includes terminals A~D and ATM exchanges EX1~EX4. Further, VCC1 is a datagram VCC between the terminal A and the exchange EX1, VCC2 a datagram VCC between the terminal B and the exchange EX1, VCC3~VCC5 datagram VCCs between the exchanges EX1 and EX2, VCC6~VCC8 datagram VCCs between the exchanges EX2 and EX3, VCC9~VCC11 datagram VCCs between the exchanges EX3 and EX4, VCC12 a datagram VCC between the terminal C and the exchange EX4, and VCC13 a datagram VCC between the terminal D and the exchange EX4. The datagram VCCs (VCC1~VCC13) are set up between the terminals and ATM exchanges and between mutually adjacent ATM exchanges beforehand in such a manner that cells can be transferred from a prescribed originating terminal to the terminal of another party.

Establishing a datagram VCC in advance is performed in the same manner as in the prior-art datagram method. However, a characterizing feature of the present invention is that a plurality of datagram VCCs are established beforehand in parallel. That is, whereas a plurality of communication operations share a single common datagram VCC in the prior art, the connectionless communication approach of the present invention sets up a plurality of parallel datagram VCCs, thereby making it possible to assign a datagram VCC exclusively for each individual communication.

(b) Construction of ATM Terminal

Figure 4:
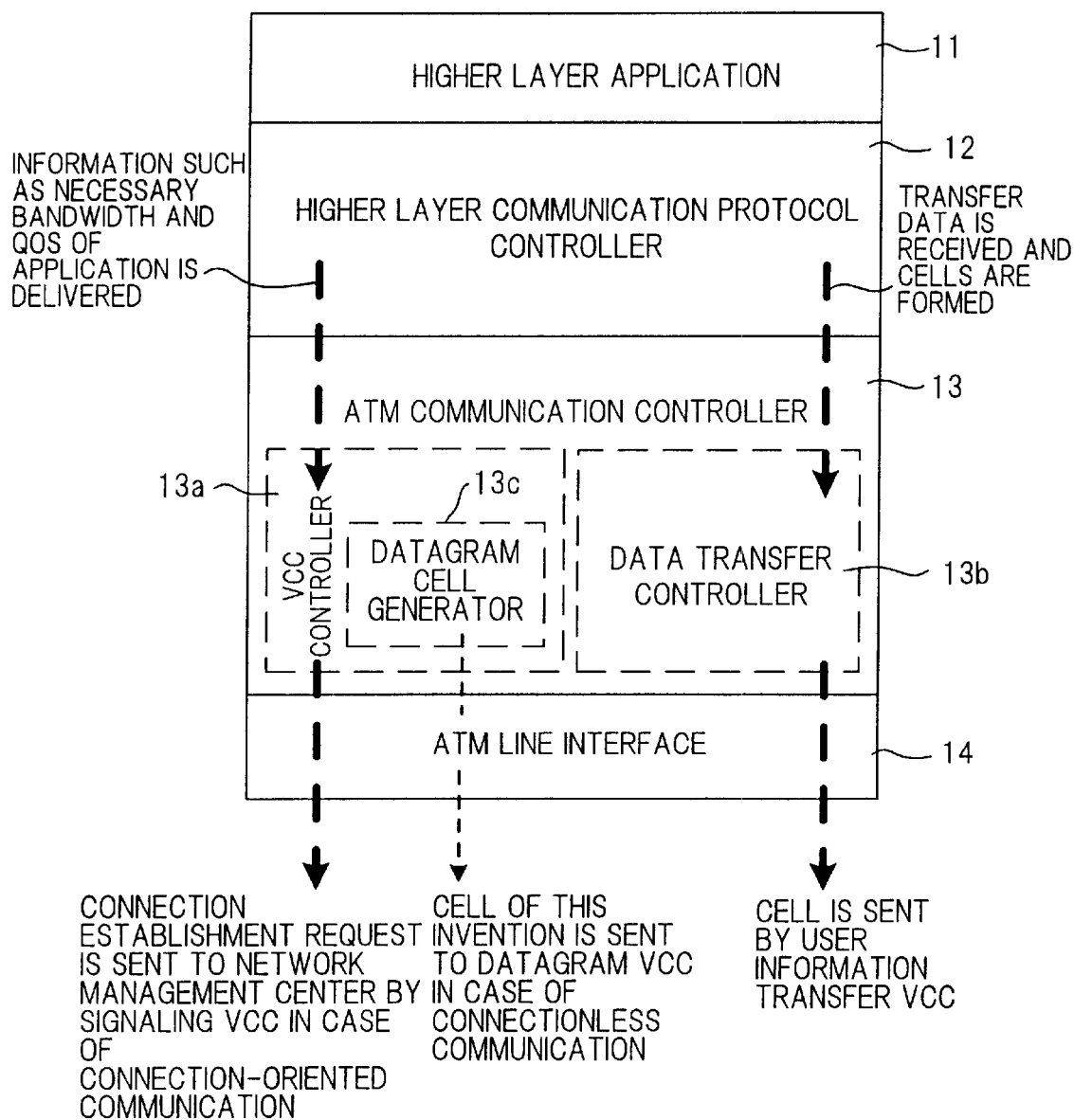
FIG. 4 is a diagram showing the construction of a terminal.

FIG. 4 is a diagram showing the construction of an ATM terminal. The ATM terminal architecture includes a higher layer application 11, a higher layer communication protocol controller 12, an ATM communication controller 13 and an ATM line interface 14. The ATM communication controller 13 has a VCC controller 13a and a data transfer controller 13b. The VCC controller 13a is provided with a datagram cell generator 13c.

In connection-oriented communication, the higher layer communication protocol controller 12 of the originating terminal (assumed to be terminal A) delivers information (destination terminal address, necessary bandwidth, QOS, etc.) for connection set-up to the VCC controller 13a before communication starts, as described earlier with reference to FIG. 32. As a result, the VCC controller 13a, via the exchange EX1 and through use of a common signal line (a signaling VCC), requests the network management center (not shown) to establish a connection. In response to the request from the originating terminal A, the network management center sets up a route to the other party's terminal (assumed to be terminal B) and instructs each exchange along the route to establish a VCC. The ATM exchange EX1 notifies the originating terminal A and the ATM exchange EX4 notifies the terminal C on the terminating side of the line identifiers VPI/VCI used in communication. The data transfer controller 13b thenceforth accepts the transferred data from the higher layer, disassembles this data into cells, attaches the line identifiers (VPI/VCI) of which it has been notified to the cells and then sends the cells to the line. Each of the exchanges EX1~EX4 switches and transmits the cells while changing the line identifiers of the input cells. The terminal C accepts cells, which have the specified line identifiers, transmitted from the exchange EX4 and assembles the cells into data.

The higher layer protocol 12 delivers the information such as the destination terminal address, necessary bandwidth and QOS to the VCC controller 13a in connectionless communication as well. However, in the case of connectionless communication, the datagram cell generator 13c of the VCC controller 13a generates the datagram cell (leading cell) shown in FIG. 2 and (1) attaches the line identifiers (VPI/VCI), which have been set beforehand for the datagram VCC (VCC1) between the terminal and the exchange, to the cell header of this leading cell, and (2) includes the cell identifier ID, destination terminal address DA, originating terminal (source terminal) address SA and other information in the payload of the cell and then sends the cell to the line. Next, the data transfer controller 13b accepts the transferred data from the higher layer, disassembles this data into cells, attaches line identifiers (VPI/VCI), which are identical with those that were added onto the leading cell, to these cells and then sends the cells to the line. Each of the exchanges EX1~EX4 refers to the destination terminal address indicated by the leading cell, assigns a prescribed datagram VCC for the purpose of connectionless communication and, using the above-mentioned datagram VCC, transmits data cells having line identifiers identical with those of the leading cell. The terminal C accepts the cells transmitted from the exchange EX4 and assembles them into data.

It should be noted that the cell identifier ID in the leading cell is a 2-byte bit string indicating that the cell is a datagram cell. The destination terminal address AD is the IP address of the terminal on the terminating side or a subscriber number used by a B-ISDN, the source terminal address SA is the IP address of the originating terminal or a subscriber number used by the B-ISDN, and the other information is the protocol identifier, traffic descriptor, QOS class, communication persistence, etc.

The protocol identifier indicates the particular protocol address specified by the terminal address described in the address field, and the traffic descriptor indicates such properties as average speed, peak speed, burstiness and peak maintenance time. This traffic descriptor is the same as that used in a signaling cell at the time of call set-up in a B-ISDN. QOS (Quality of Service) class indicates, in the form of categories, quality stipulated by cell loss rate, delay time, delay fluctuation, etc. QOS class is the same as that used in the signaling cell of a B-ISDN. Communication persistence is duration of communication calculated from, say, a prediction of the total quantity of data exchanged by an application.

Thus, the leading cell possesses a unique bit string, which indicates that the cell is a datagram cell (leading cell), in the two bytes that follow the cell header. This makes it possible for an exchange to detect leading cells that arrive at an arbitrary timing. Further, in connectionless communication, a terminal address used to route data is not limited to an IP address; the subscriber number in a B-ISDN may be used as well. That is, the higher layer protocol is not limited to a TCP/IP. This means that the protocol identifier is provided in the information field F4 of the leading cell. As a result, each exchange that has received a leading cell is capable of determining which protocol address is indicated by the terminal address.

(c) Construction of Exchange

Figure 5:
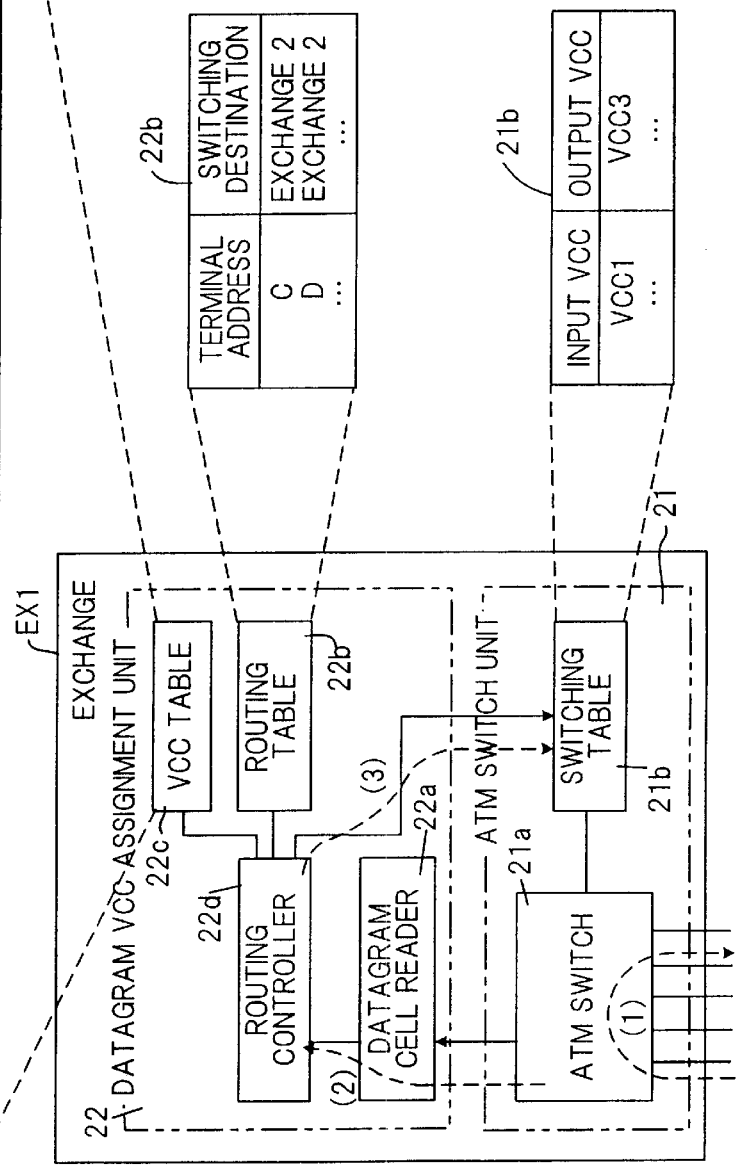
FIG. 5 is a diagram showing the construction of an exchange.

FIG. 5 is a diagram showing the construction of the exchange EX1. The other exchanges EX2~EX4 are identically constructed. The exchange EX1 includes an ATM switch unit 21 and a datagram VCC assignment unit 22. The ATM switch unit 21 has an ATM switch 21a that switches cells to a prescribed path, discriminates datagram cells (leading cells) and sends the cells to the datagram VCC assignment unit 22, and a switching table 21b for storing correspondence between line identifiers (VPI/VCIs) of input VCCs and line identifiers (VPI/VCIs) of output VCCs. The ATM switch 21a sends input cells to prescribed output VCCs upon referring to the corresponding relationships that have been stored in the switching table 21b.

The datagram VCC assignment unit 22 has a datagram cell reader 22a for reading and outputting information included in the payload of a datagram cell, and a routing table 22b storing the correspondence between terminal addresses and switching destinations (exchanges). Since the switching destination is exchange 2 if the destination terminals are C and D, "Exchange 2" is stored in the table in correspondence with the terminal addresses of the terminals C and D in the manner illustrated. The datagram VCC assignment unit 22 further includes a VCC table 22c for managing, in regard to each datagram VCC set in advance between the table's own exchange (exchange 1) and another exchange, the set QOS class, the set bandwidth, whether the datagram VCC is in use or not, the QOS required by connectionless communication, the necessary bandwidth, communication persistence, the source address and the destination address, etc. It should be noted that only the VCC table of the datagram VCCs established between the exchanges EX1 and EX2 is illustrated in FIG. 5. The datagram VCC assignment unit 22 further includes a routing controller 22d for deciding a prescribed datagram VCC by referring to the routing table 22b and VCC table 22c based upon the destination address indicated by the leading cell, and for storing, in the switching table 21b, the correspondence between the line identifiers of the leading cell and the line identifiers of the datagram VCC. More specifically, the routing controller 22d obtains the exchange EX2, which is the switching destination, from the routing table 22b based upon the destination terminal address indicated by the leading cell, and then refers to the VCC table 22c on the basis of the necessary band and necessary QOS, which are included in the leading cell, to decide the prescribed datagram VCC that has been set beforehand between the exchanges EX1 and EX2.

A summary of the operation of the exchange is as follows: (1) The ATM switch 21a performs switching in the ATM layer by constantly searching the switching table 21b on the basis of the line identifiers attached to the input cells. (2) Upon receiving a datagram cell (the leading cell), the datagram cell reader 22a reads the various information contained in the payload of the leading cell and delivers this information to the routing controller 22d. (3) The routing controller 22d scrutinizes the destination terminal address field of this cell, searches the routing table 22b and VCC table 22c to decide the output-destination datagram VCC assigned to this communication, and registers this datagram VCC in the switching table 21b. Data cells having line identifiers identical with those of the leading cell are thenceforth transmitted to the datagram VCC that has been decided.

Thus, time-consuming assembling of a packet is unnecessary. Further, it suffices to execute the processing of steps (2) and (3) merely upon receiving the leading cell; subsequent cells are routed to the prescribed path at high speed merely by the processing of step (1).

(d) Detailed Operation of Exchange

Figure 6:
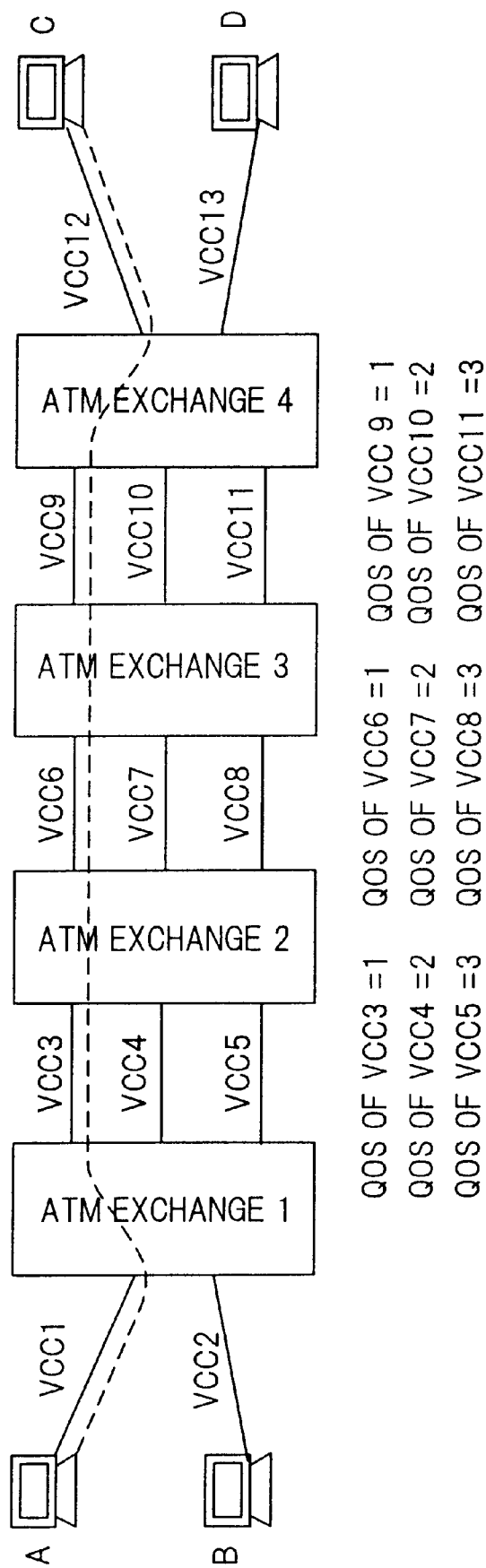
FIG. 6 is a diagram useful in describing the operation of the exchange.

Reference will be had to the flowchart of FIG. 7 to describe the operation of the exchange EX1 in regard to a case where the terminal A has sent data addressed to the terminal C to a datagram VCC (VCC1) in a network in which datagram VCCs (VCC1~VCC13) having the QOS classes shown in FIG. 6 and a bandwidth of 1.5 MHz have been established beforehand between terminals and exchanges and between mutually adjacent exchanges.

First, the ATM switch 21a of the exchange 1 detects the datagram cell (the leading cell) and inputs the cell to the datagram cell reader 22a (step 101). The datagram cell reader 22a reads the destination terminal address from the destination terminal address field F2 in the payload of the leading cell and verifies that this address is "address C" (step 102). Next, the routing controller 22d searches the routing table 22b based upon the verified terminal address C and confirms that the switching destination is the exchange 2 (step 103).

Next, the routing controller 22d verifies the QOS class from the field F4 of the datagram cell (the leading cell) (step 104). Here it is assumed that the QOS class requested by the leading cell is "QOS=1". The routing controller 22d then searches the VCC table 22c addressed to the exchange 2 (step 105) and assigns VCC3 as the optimum datagram VCC that satisfies the requested QOS class (step 106). If a datagram VCC of a QOS class that matches the QOS class requested by the datagram cell has not been registered in the VCC table 22c, or if this datagram VCC is currently in use, a datagram VCC having a class better than the requested QOS class is assigned to the extent possible (Class 1 is the best class and Class 5 is the worst class).

When the assignment of the datagram VCC is completed, the routing controller 22d updates the VCC table 22c (step 107) and stores the correspondence between the line identifiers (VPI/VCI) of the leading cell and the line identifiers (VPI/VCI) of the assigned datagram VCC in the switching table 21b (step 108). The VCC table 22c is updated from the content shown in FIG. 5 to the content shown in FIG. 8A by the processing of step 107. Further, the corresponding relationship between the line identifiers of VCC1 and VCC3 is stored in the switching table 21b by the processing of step 108 in the manner shown in FIG. 8B.

The exchange EX1 thenceforth transfers the datagram cell (the leading cell) addressed to terminal C to the datagram VCC (VCC3) (step 109). Upon receiving the leading cell address to terminal C, the exchange EX2 assigns VCC6 to this communication as the datagram VCC through a procedure similar to that described above. Similarly, the exchange EX3 assigns VCC9 to this communication as the datagram VCC, and the exchange EX4 assigns VCC12 as the datagram VCC, thereby establishing a connectionless communication path between the terminals A and C.

The ATM switch 21a of each of the exchanges EX1~EX4 thenceforth refers to the switching table 21b to transmit data cells having line identifiers identical with those of the leading cell to the assigned datagram VCC that is the destination of the output.

The fact that the necessary bandwidth is 3M in FIG. 8A indicates that the necessary bandwidth specified by the traffic descriptor in the datagram cell (the leading cell) was 3M. Similarly, the fact that persistence is 1 indicates that the value specified by the communication persistence in the datagram cell was 1. This communication persistence data is obtained by standardizing communication durations to 1~n. Time may also be used as the communication persistence data.

(e) Exchange Having Allocated Bandwidth Optimizing Function (e-1) Construction

Figure 9:
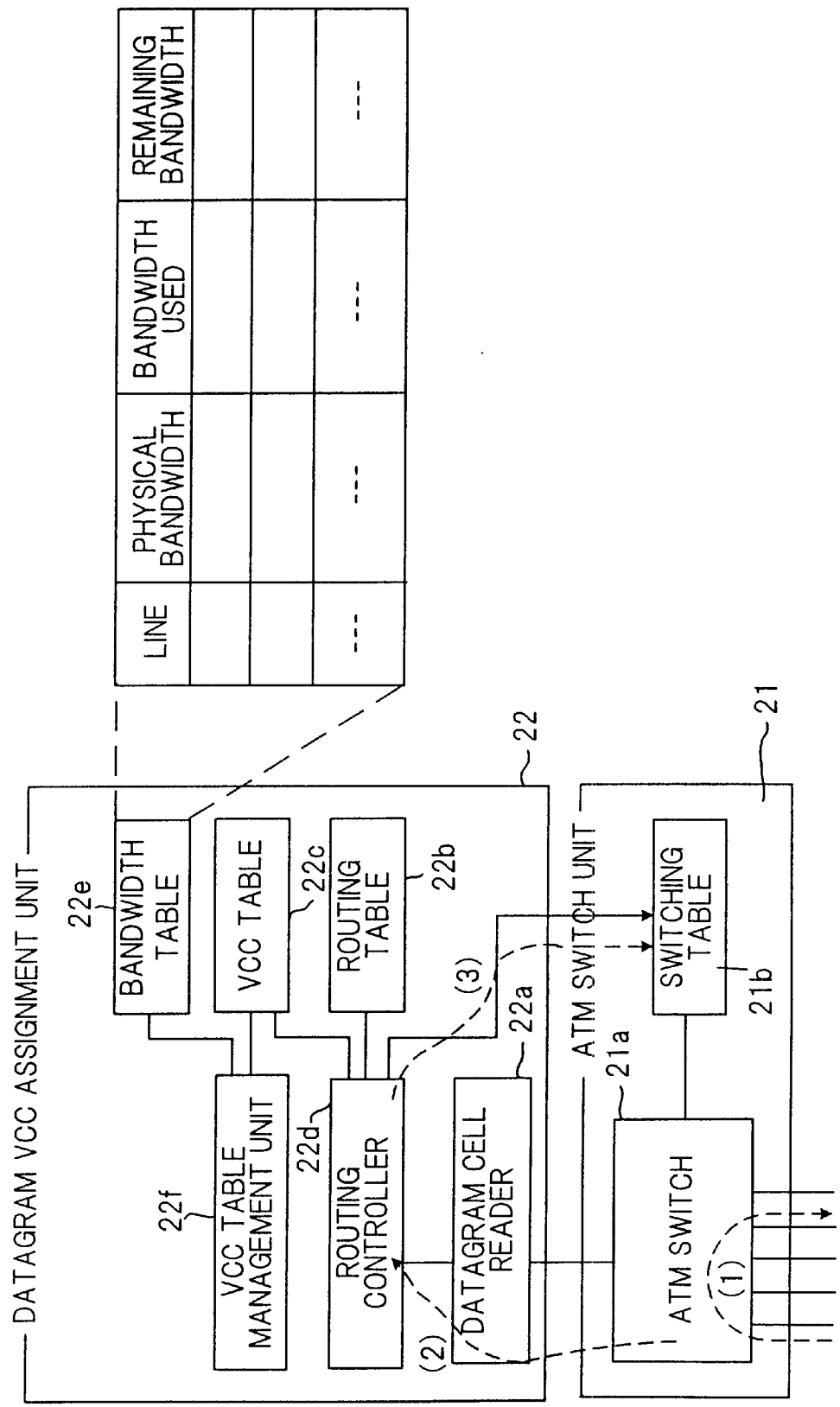
FIG. 9 is a diagram showing the construction of an exchange equipped with a function for optimizing allocated bandwidth.

FIG. 9 is a diagram showing the construction of an exchange equipped with a function for optimizing allocated bandwidth. Components identical with those of the exchange shown in FIG. 5 are designated by like reference characters. This exchanges differs from that of FIG. 5 in that the datagram VCC assignment unit 22 is provided with a bandwidth table 22e and a VCC table management unit 22f. The bandwidth table 22e stores, for every physical line connected to the exchange, the correspondence among (1) the physical bandwidth (maximum usable bandwidth) of the line, (2) the bandwidth currently in use, and (3) the remaining bandwidth capable of being allocated. The VCC table management unit 22f performs bandwidth allocation optimization control based upon the content of the bandwidth table 22e and the band (necessary band) and QOS class requested by the originating terminal.

(e-2) First Bandwidth Reallocation Control

In the control operation of FIG. 7, the exchange EX1 assigns a 1.5-Mbps datagram VCC (VCC3) to the datagram cell (leading cell) of connectionless communication between the terminals A and C requesting 3 Mbps and the content of the VCC table 22c is as shown in FIG. 8A. The reason for this is that not a very large bandwidth can be allocated to an unused datagram VCC set beforehand for each exchange. In the case of exchange EX1, 1.5 Mbps is allocated to each VCC. Thus, there are many cases in which a datagram VCC having a bandwidth that does not satisfy the bandwidth required by the datagram cell (the leading cell) must be allocated.

Accordingly, the exchange of FIG. 9 performs control in such a manner that the already available 1.5-Mbps datagram VCC is supplied for the connectionless communication requested and, while communication is being supported at this bandwidth, the allocated bandwidth of this datagram VCC is increased up to the bandwidth requested by the datagram cell (the leading cell). As a result of such control, communication can continue smoothly. In the event that the line to the exchange of the next stage does not possess sufficient bandwidth resources for increasing the bandwidth in this case, the allocated bandwidths of other unused datagram VCCs are reduced to acquire allocated bandwidth resources for the sake of the above-mentioned datagram VCC currently in use. Similarly, in a case where there has been a change in the necessary QOS, control is performed so as to maintain communication at the originally allocated QOS class and change the QOS class of the datagram VCC in the meantime.

Figure 10:
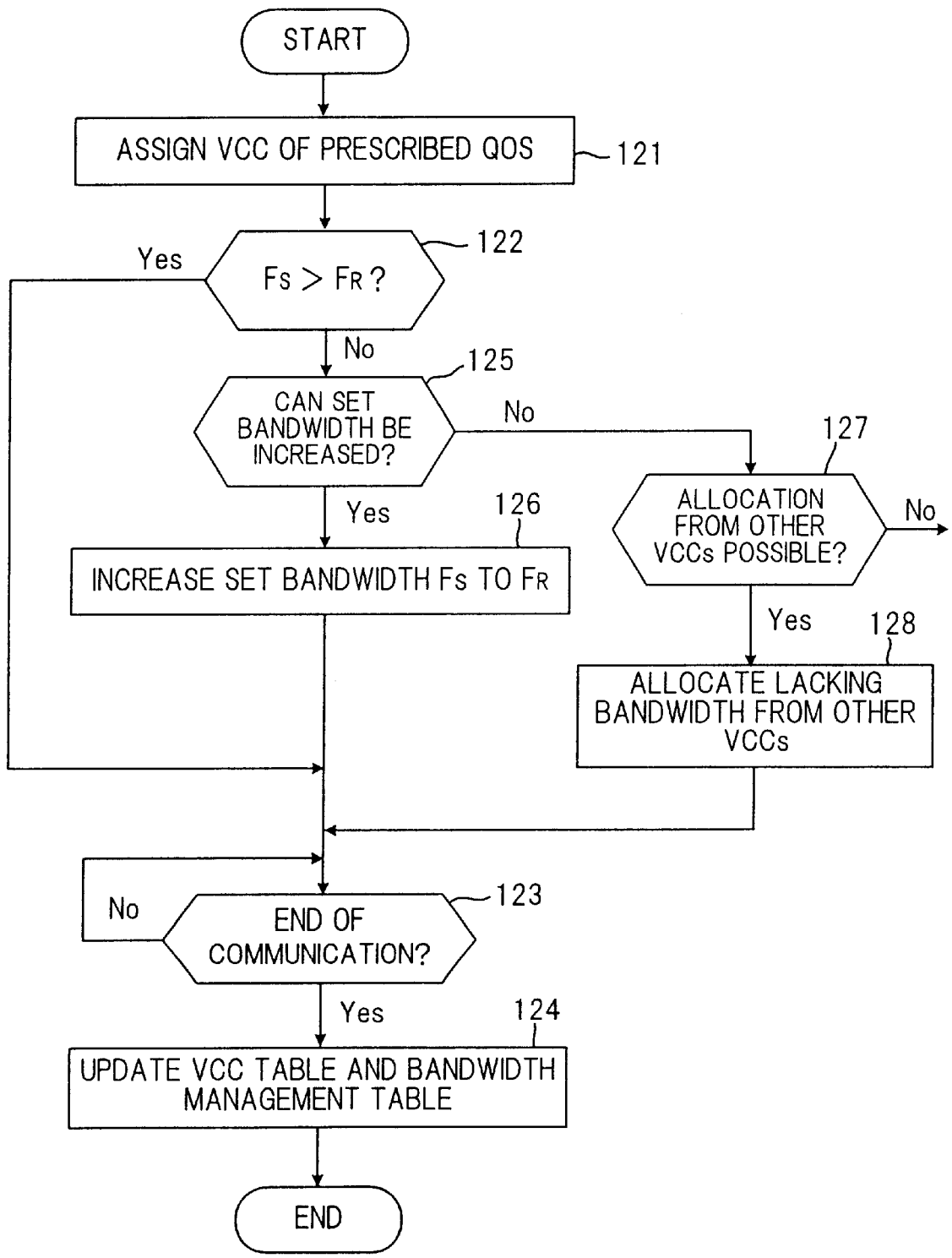
FIG. 10 is a flowchart showing control for optimizing allocated bandwidth.

FIG. 10 is a flowchart of processing for first allocation optimization control by the VCC table management unit 22f.

A datagram VCC having the prescribed QOS is assigned to connectionless communication requested by the leading cell (step 121). As a result, the content of the VCC table 22c becomes as shown in FIG. 11A.

Next, the VCC table management unit 22f obtains the set bandwidth $F_S$ of the assigned datagram VCC from the VCC table 22c and compares the set bandwidth $F_S$ and the requested necessary bandwidth $F_R$ in terms of the magnitudes thereof (step 122). If $F_S \geq F_R$ holds, reallocation of bandwidth is not carried out and the end of connectionless communication is awaited (step 123). In response to end of communication, the assigned datagram VCC is released and the various tables are updated (step 124).

If $F_S < F_R$ is found to hold at step 122, however, then the VCC table management unit 22f refers to the bandwidth table 22e and determines whether the physical line in which the datagram VCC exists has enough surplus bandwidth to increase the set bandwidth (step 125). If there is enough surplus bandwidth to increase the set bandwidth to the necessary bandwidth, then the VCC table management unit 22f raises the set bandwidth $F_S$ to the necessary bandwidth $F_R$ and updates the content of the VCC table 22c and bandwidth table 22e (step 126). As a result, the content of the VCC table 22c is updated from the content shown in FIG. 11A to the content shown in FIG. 11B. The end of connectionless communication is then awaited (step 123). In response to end of communication, the assigned datagram VCC is released and the various tables 22c, 22e, etc., are updated (step 124).

If it is found at step 125 that surplus bandwidth does not exist, then the VCC table management unit 22f refers to the VCC table 22c and judges whether it is possible to reduce the allocated bandwidths (set bandwidths) of other unused datagram VCCs (step 127). If this is possible, then the VCC table management unit 22f reduces the allocated bandwidths of these other unused datagram VCCs and updates the content of the VCC table 22c and bandwidth table 22e (step 128). As a result, the content of the VCC table 22c is updated from the content shown in FIG. 11A to the content shown in FIG. 11C. The end of connectionless communication is then awaited (step 123). In response to end of communication, the assigned datagram VCC is released and the various tables 22c, 22e, etc., are updated (step 124). In a case where the set bandwidth $F_S$ cannot be increased to the necessary bandwidth $F_R$ even when the allocated bandwidths (set bandwidths) of other unused datagram VCCs are reduced at step 127, control is performed in such a manner that communication satisfying the necessary bandwidth can be carried out by other means, e.g., by establishing a direct VCC, described later.

(e-3) First Bandwidth Reallocation Control

During the time that connectionless communication is being maintained via a datagram VCC, an application which generates the transfer of a large quantity of data may be started up at a terminal and the particulars (necessary QOS, necessary bandwidth, communication persistence, etc.)

which the terminal requests of the network may change. In such case the ATM terminal sends a datagram cell (request-change cell) in order to notify of the requested change, thereby informing the network of the change in request. The network performs bandwidth and QOS reallocation control so as to satisfy the request. It should be noted that the request-change cell has a structure exactly the same as that of the leading cell.

FIG. 12 is a diagram useful in describing the operation of an ATM terminal when a request is changed. The higher layer communication protocol controller 12 of the ATM terminal notifies the VCC controller 13a of a change in bandwidth, necessary QOS and total quantity of data required for execution of an application. In response, the datagram cell generator 13c of the VCC controller 13a generates a datagram cell (request-change cell) having a format identical with that of the leading cell shown in FIG. 2 and sends the generated cell to the datagram VCC. The exchange that has detected the datagram cell (request-change cell) searches the switching table 21b and determines whether the datagram VCC on which the cell arrived has already been registered, thereby discriminating whether the datagram cell is a leading cell or request-change cell. That is, if the datagram VCC has not been registered, then the arriving cell is the leading cell. If the datagram VCC has been registered, on the other hand, then the arriving cell is the request-change cell. If the arriving cell is the request-change cell, then the datagram VCC has already been assigned, switching processing is not executed again and control for reallocating bandwidth and QOS is carried out so as to satisfy the new request.

Figure 13:
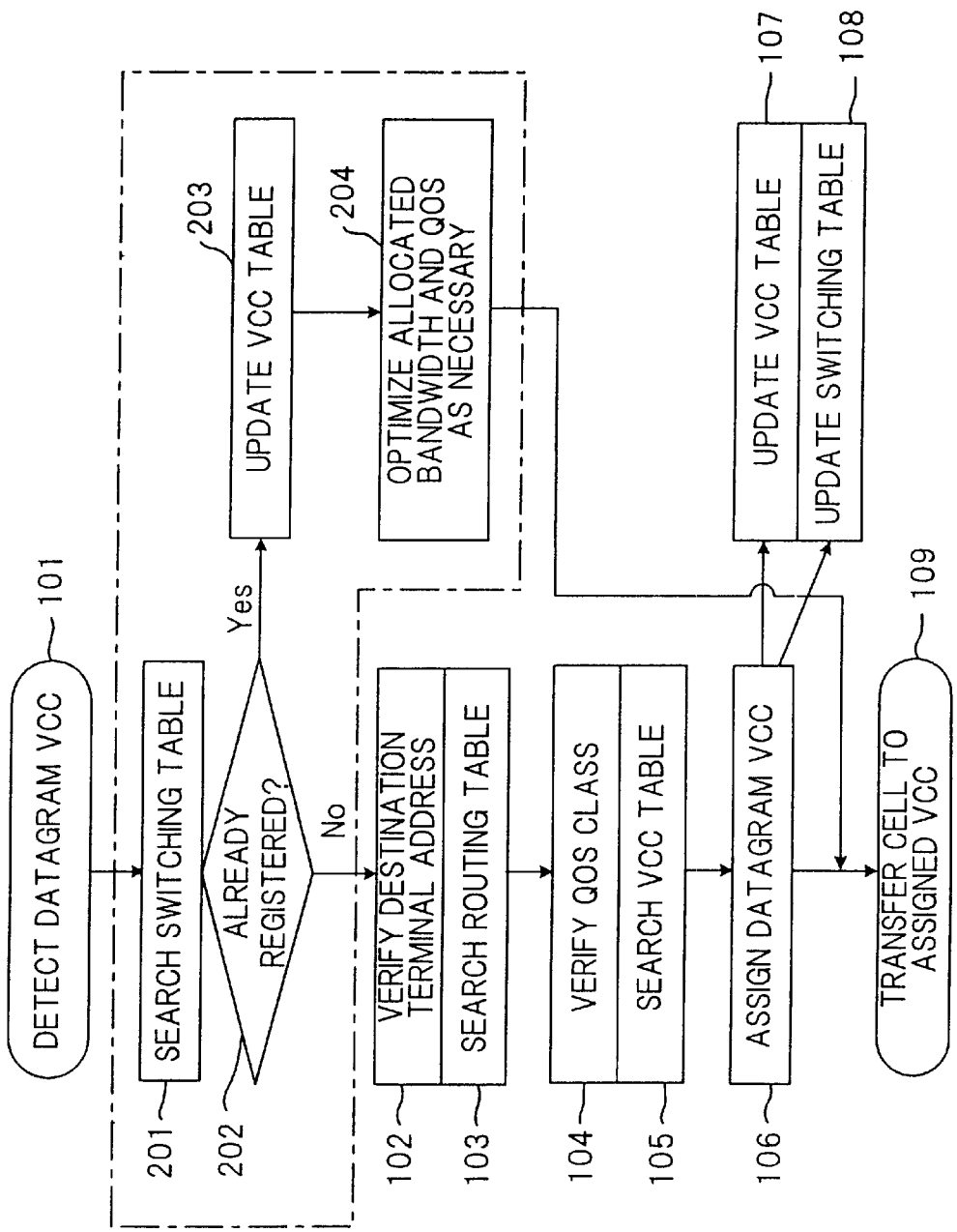
FIG. 13 is a flowchart showing control performed by an exchange when a request is changed.

FIG. 13 is a flowchart of control performed by an exchange when a request is changed.

If a datagram cell is received (step 101), the exchange searches the switching table 21b (step 201) and determines whether a datagram VCC on which the cell arrived has already been registered (step 202). If the datagram VCC on which the cell arrived has not been registered in the switching table 21b, this means that the arriving cell is the leading cell and, hence, the control (steps 102~109) described above with reference FIG. 7 is executed.

If it is found at step 202 that the datagram VCC on which the cell arrived has been registered in the switching table 21b, on the other hand, then the cell is the request-change cell. Accordingly, the exchange updates the necessary bandwidth, necessary QOS and communication persistence in the VCC table 22c based upon the request indicated by the request-change cell (step 203). The exchange then executes bandwidth and QOS optimization processing so as to satisfy the new request (step 204).

Figure 14:
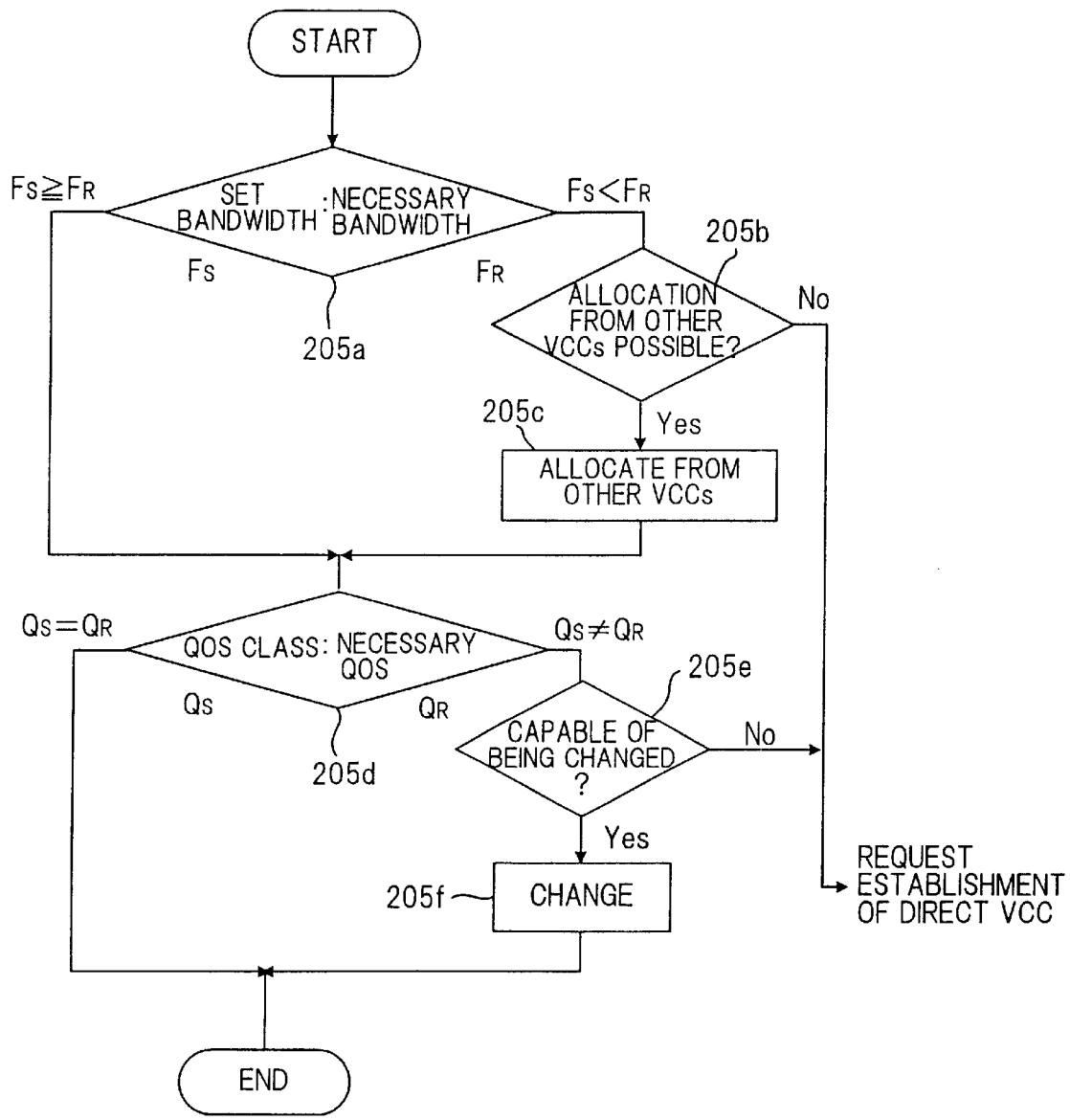
FIG. 14 is a flowchart of optimization processing executed by exchange.

FIG. 14 is a flowchart of optimization processing executed by an exchange. First, the exchange refers to the VCC table 22c and compares the set bandwidth $F_S$ and the requested necessary bandwidth $F_R$ in terms of the magnitudes thereof (step 205a). If $F_S \geq F_R$ holds, then the program proceeds to QOS reallocation processing. If $F_S < F_R$ holds, however, then the exchange refers to the VCC table 22c and determines whether the shortfall $(=F_R-F_S)$ is capable of being appropriated from the allocated bandwidths (set bandwidths) of other unused datagram VCCs (step 205b). If this is possible, then the exchange reduces the allocated bandwidths of these other unused datagram VCCs to make up for the shortfall (step 205c). However, if it is impossible for the shortfall to be appropriated from the allocated (set) bandwidths of other unused datagram VCCs, then establishment of a direct VCC is requested. The establishment of a direct VCC will be described later.

When processing for reallocating bandwidth ends, the exchange refers to the VCC table 22c and compares the set QOS ($=Q_S$) and the necessary QOS ($=Q_R$) (step 205d). Optimization processing is terminated if $Q_S=Q_R$ holds. If $Q_S \neq Q_R$ holds, however, the exchange determines whether the set QOS is capable of being changed to the necessary QOS (step 205e). If the change is possible, then the exchange changes the set QOS to the necessary QOS and terminates optimization processing (step 205f). If the change is not possible, however, then the exchange requests establishment of a direct VCC.

(f) Communication Termination Control

When connectionless communication carried out using a datagram VCC ends, the datagram cell generator 13c of the ATM terminal generates a datagram cell (communication-end notification cell), which indicates that communication using the above-mentioned datagram VCC has ended, and sends the cell to the exchange. The exchange executes termination processing upon receiving the communication-end notification cell.

Figure 15A:
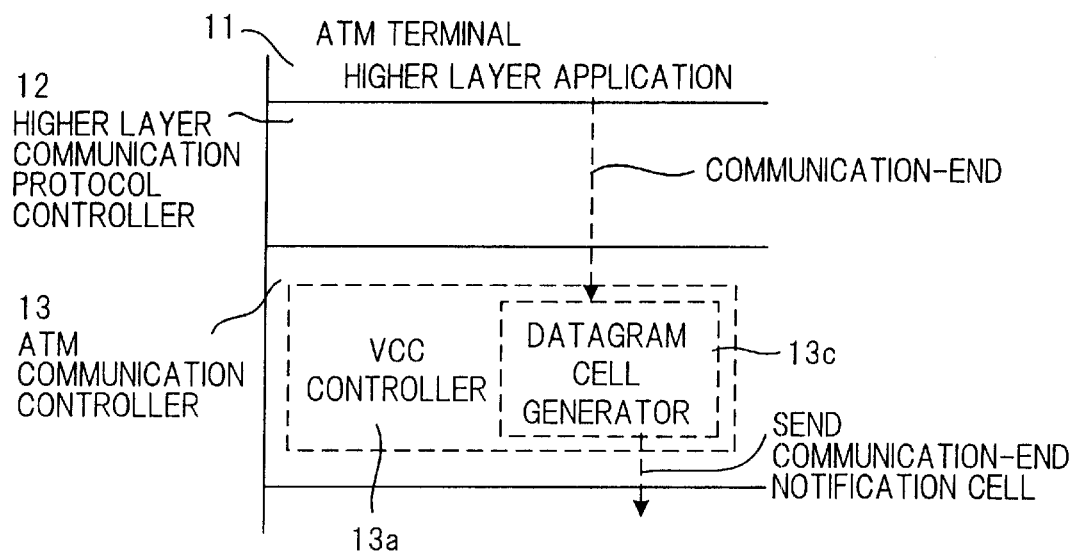
FIGS. 15A and 15B are diagrams useful in describing the operation of the ATM terminal when communication ends.
Figure 15B:
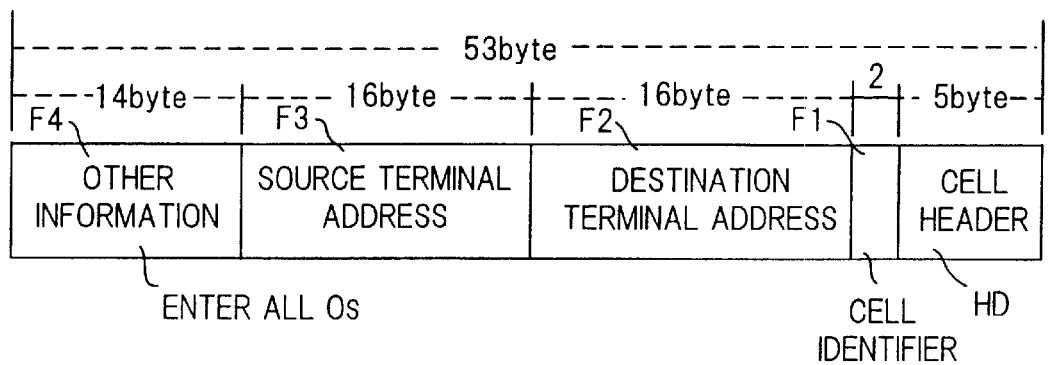

FIG. 15A is a diagram useful in describing the operation of the ATM terminal when communication ends. The higher layer communication protocol controller 12 of the ATM terminal responds to the end of communication by notifying the VCC controller 13a of this fact. As a result, the datagram cell generator 13c of the VCC controller 13a generates a datagram cell (communication-end notification cell), shown in FIG. 15B, for giving notification of the end of communication, and sends this cell to the datagram VCC. The datagram cell generator 13c inserts invalid data, which is composed of all 0s, in the information field F4 of the communication-end notification cell to make this call distinguishable from other datagram cells.

Figure 16:
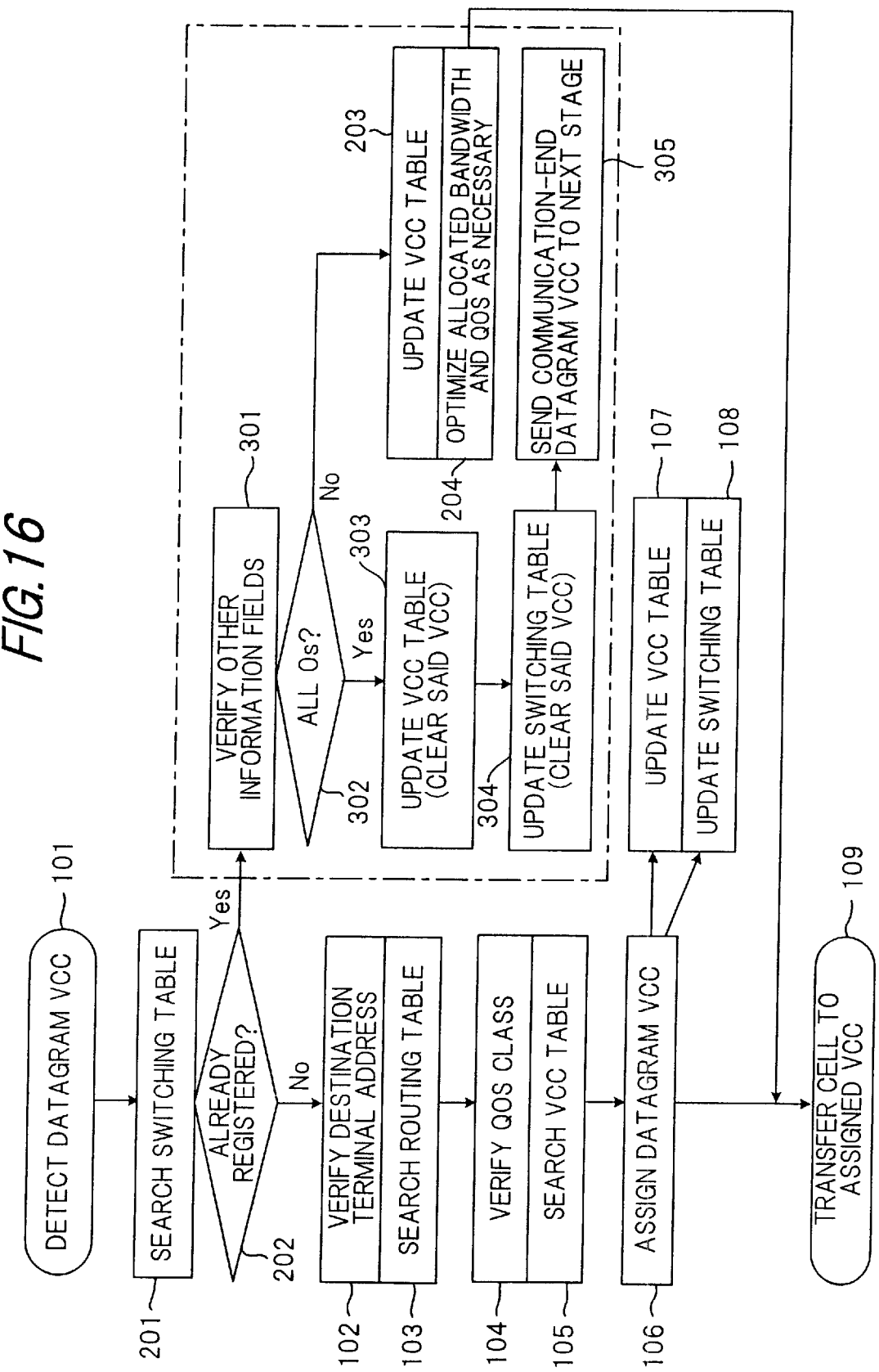
FIG. 16 is a flowchart of communication termination processing executed by an exchange.

FIG. 16 is a flowchart of communication termination processing executed by an exchange. When a datagram cell is received (step 101), the exchange searches the switching table 21b (step 201) and determines whether the datagram VCC on which the cell arrived has already been registered (step 202). If the datagram VCC on which the cell arrived has not been registered in the switching table 21b, this means that the arriving cell is the leading cell and, hence, the control (steps 102~109) described above with reference FIG. 7 is executed.

If it is found at step 202 that the datagram VCC on which the cell arrived has been registered in the switching table 21b, on the other hand, then the exchange refers to the F4 field of this cell to determine whether the content of this field is all 0s (steps 301, 302). If the content of this field is not all 0s, this means that the arriving cell is the request-change cell. Accordingly, the exchange updates the necessary bandwidth, necessary QOS and communication persistence in the VCC table 22c based upon the request indicated by the request-change cell (step 203). The exchange then executes bandwidth and QOS optimization processing so as to satisfy the new request (step 204).

If it is found at step 302 that the content of this field is all 0s, this means that the arriving cell is the communication-end notification cell. Accordingly, the exchange updates the content of the VCC table 22c. That is, the exchange clears the data conforming to the datagram VCC used thus far (step 303) and updates the content of the switching table 21b. More specifically, the correspondence between the line identifiers of the input datagram VCC used thus far and the line identifiers of the output datagram VCC is deleted from the switching table 21b by the exchange (step 304). Thus, owing to the fact that a terminal sends a datagram cell indicative of the end of communication, the exchange is released from assigning a datagram VCC to this communication at the end of communication, whereby it is possible to avoid using more network resources than necessary. Further, the exchange sends the communication-end notification cell to the next terminal along the route (step 305). As a result, other terminals are similarly released from assigning datagram VCCs and, as a consequence, the route between the terminals A and C established by datagram vanishes.

By virtue of the above-described communication termination processing, the VCC table 22c and switching table 21b are cleared to their original states, as shown in FIGS. 17A and 17B, respectively.

(g) Control for Establishment of Direct VCC Between Terminals (g-1) Necessity for Direct VCC When an ATM terminal has sent a request-change cell to request the network for increased bandwidth, there are cases where the network will be incapable of assuring a bandwidth that satisfies the request with a route that has already been established in such cases the exchange regards the request-change notification from the terminal as a request to establish connection-oriented communication and requests the network management center to establish a direct VCC between terminals. The bandwidth necessary for continuation of communication is acquired by performing communication via the VCC established by the network management center.

(g-2) Network Configuration

Figure 18:
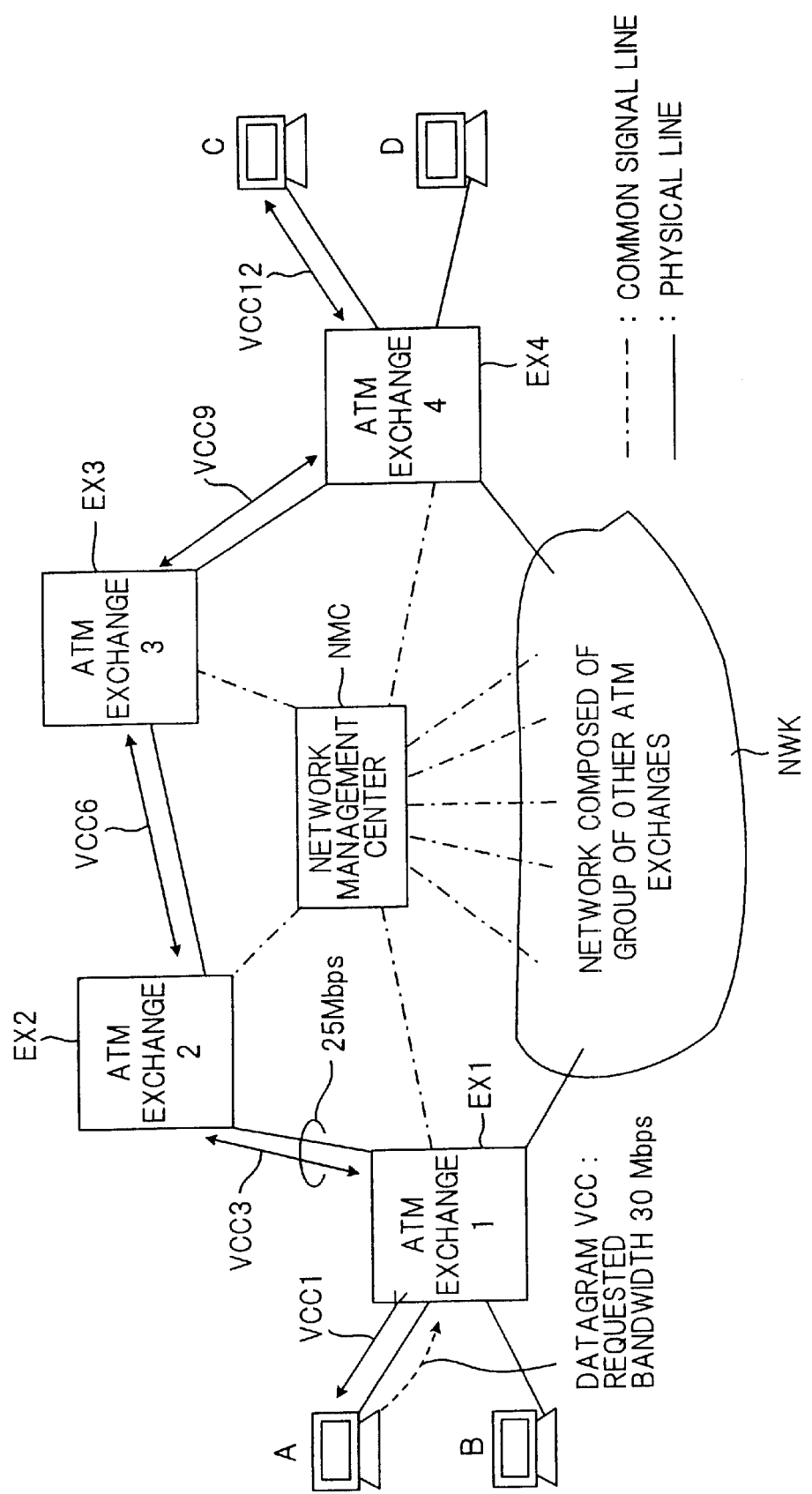
FIG. 18 is a diagram showing the configuration of a network that makes possible control for establishing a direct VCC.

FIG. 18 is a diagram showing the configuration of a network that makes possible control for establishing a direct VCC between terminals. Shown in FIG. 18 are ATM terminals A D, ATM exchanges EX1~EX4, a network NWK composed of a group of ATM exchanges, and a network management center NMC.

A connectionless communication route (exchanges EX1→EX2→EX3→EX4) is established between the terminals A and C, which proceed to communicate via this route. Assume that the terminal A has sent a request-change cell requesting a bandwidth of 30 Mbps. Since the maximum usable bandwidth over a line between the exchanges EX1 and EX2 is 25 Mbps, the bandwidth of 30 Mbps necessary for connectionless communication between the terminals A and C cannot be acquired over the already established communication path. In such case the exchange EX1, on the basis of request-change notification from the terminal A, requests the network management center NMC to establish a direct VCC between the terminals A and C using the common signal line. In connection-oriented communication (see FIG. 32), a request of this kind directed to the network management center usually is issued by the VCC controller of the ATM terminal. However, when a direct VCC, which is substituted for a route already established by datagram-type communication (connectionless communication), is established, the exchange EX1, not the ATM terminal, sends the network management center NMC the request to establish the direct VCC.

(g-3) Construction of Exchange

Figure 19:
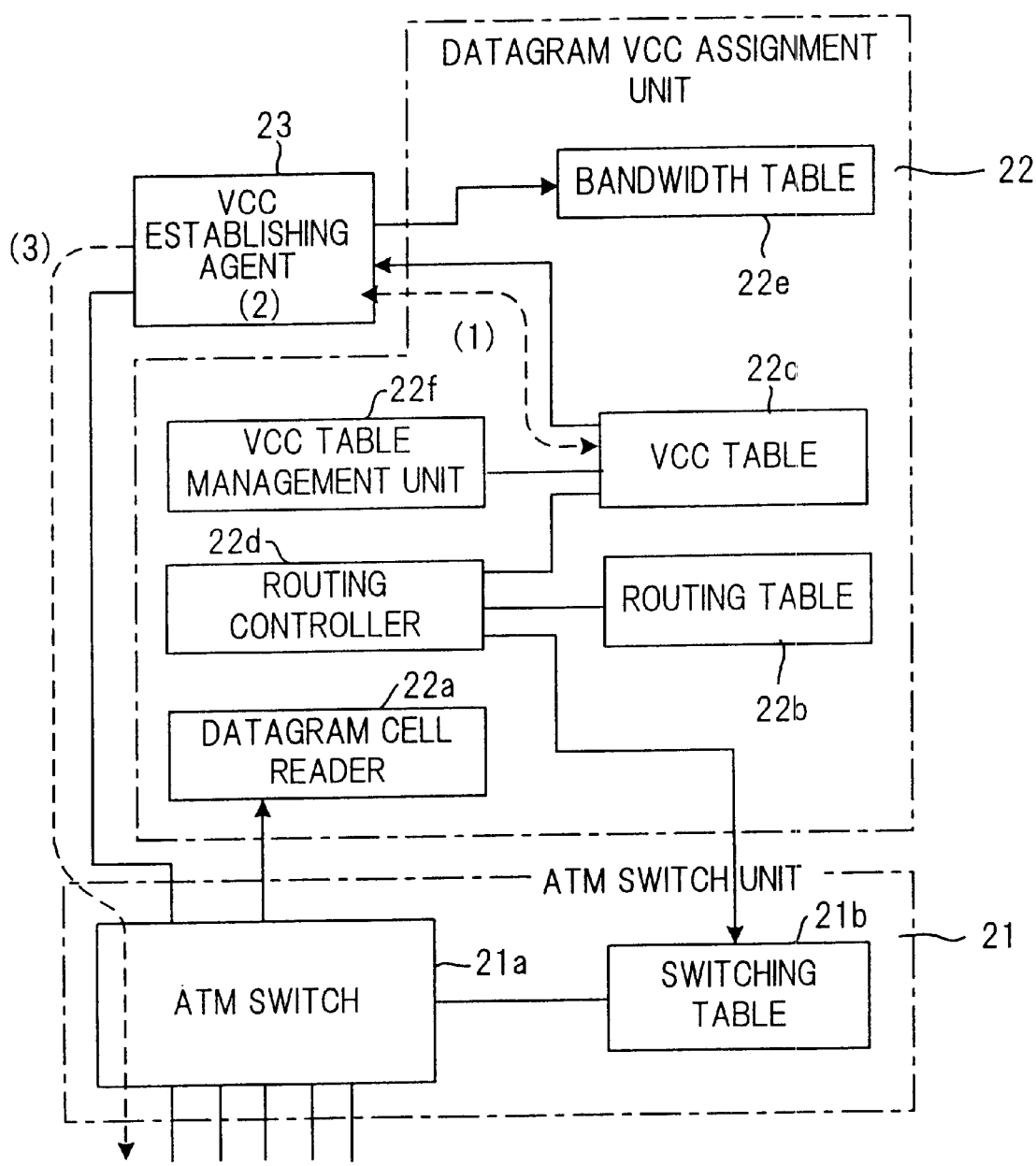
FIG. 19 is a diagram showing the construction of an exchange equipped with a VCC establishing function.

FIG. 19 is a diagram showing the construction of an exchange which implements control for requesting a direct VCC. Components identical with those of the exchange shown in FIG. 9 are designated by like reference characters. This exchanges differs from that of FIG. 9 in the provision of a VCC establishing agent 23. On the basis of the content of the VCC table 22c, the VCC establishing agent 23 generates signaling data and sends the network management center NMC a request to establish a direct VCC between the terminals A and C. More specifically, the VCC establishing agent 23 (1) monitors the requested terminal bandwidth $F_R$ that has been registered in the VCC table 22c and the remaining line bandwidth managed by the bandwidth table 22e. If the requested bandwidth of the terminal can be furnished by the remaining bandwidth of the line, the VCC establishing agent 23 performs control in such a manner that the remaining bandwidth of the line is allocated to the datagram VCC. (2) If the requested bandwidth of the terminal cannot be supplied by the remaining bandwidth of the line, then the VCC establishing agent 23 generates data for requesting the network management center NMC to establish a direct VCC. (3) The VCC establishing agent 23 uses the common signal line to send the network management center NMC signaling data which requests establishment of the direct VCC between the terminals.

(g-4) Communication Control Based Upon Establishment of Direct VCC

Figure 20:
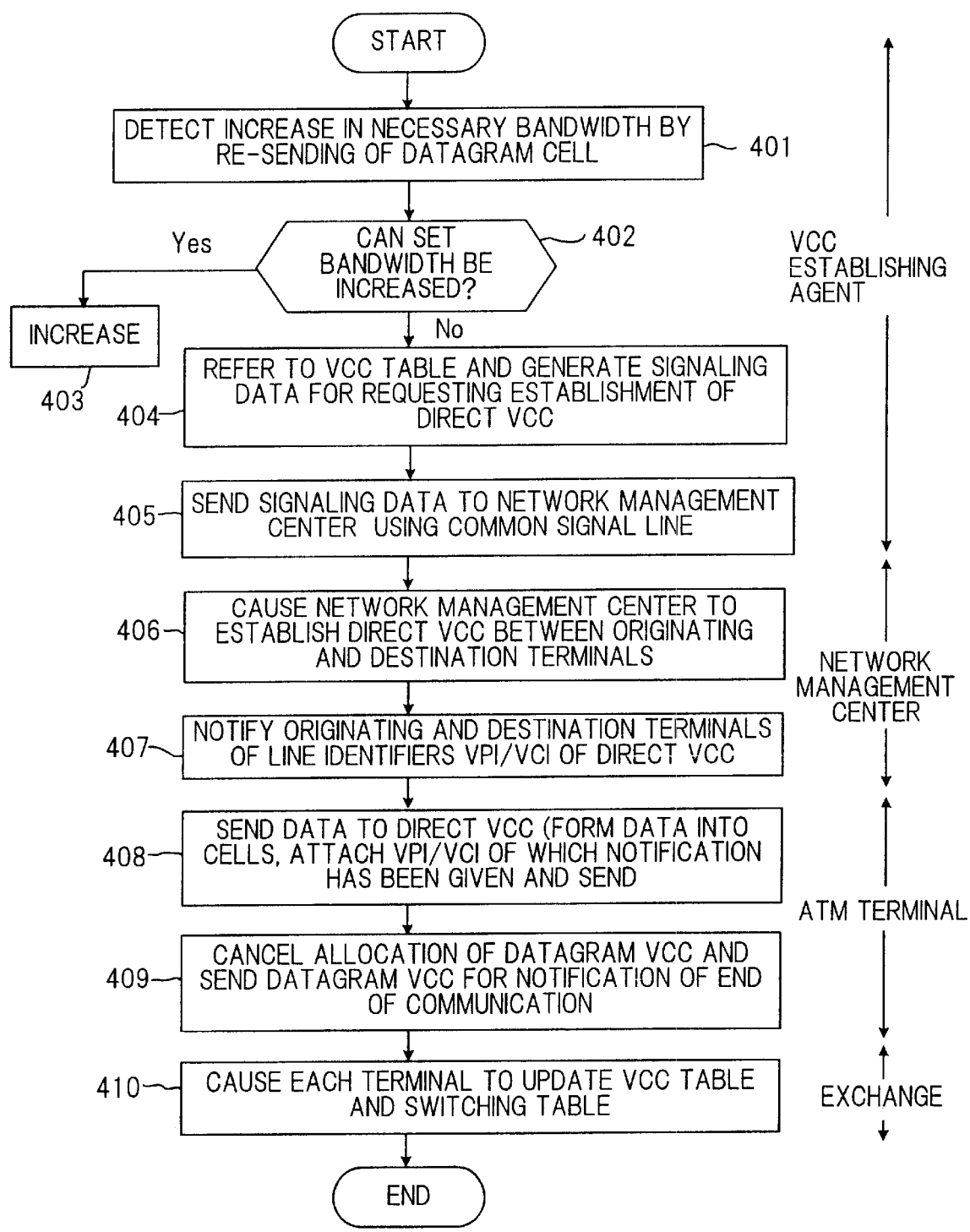
FIG. 20 is a flowchart of processing for establishing a direct VCC and for performing communication control (for increasing bandwidth)

FIG. 20 is a flowchart of direct VCC establishment and communication control.

Upon being notified of an increase in necessary bandwidth by a datagram cell (request-change cell), i.e., upon detecting an increase in necessary bandwidth by referring to the VCC table 22c (step 401), the VCC establishing agent 23 determines whether the line has enough surplus bandwidth to increase the set bandwidth $F_S$ of the datagram VCC assigned to connectionless communication to the requested bandwidth $F_R$ (step 402). If enough bandwidth remains, the VCC establishing agent 23 increases the set bandwidth $F_S$ to the requested bandwidth $F_R$ (step 403).

If the line does not have enough surplus bandwidth to increase the set bandwidth $F_S$ to the requested bandwidth $F_R$, on the other hand, the VCC establishing agent 23 refers to the VCC table 22c to obtain the necessary bandwidth, necessary QOS, source address and destination address, uses this information to generate signaling data for requesting establishment of a direct VCC (step 404), and uses the common signal line to request the network management center NMC to establish the direct VCC between the terminals A and C (step 405).

Upon receiving the request to establish the direct VCC between the terminals A and C, the network management center NMC calculates a route between the terminals A and C, instructs each exchange in the group of ATM exchanges constituting the route to set a VCC between the terminals A and C, thereby establishing a direct VCC between terminals A and C (step 406). Next, the network management center NMC notifies the terminals A and C of the line identifiers (VPI/VCI) of the direct VCC, which is substituted for the datagram VCC (step 407), via the common signal line.

As a result, the VCC controller 13a of the terminal receives the line identifiers of the direct VCC from the common signal line, as shown in FIG. 21. Upon being notified of the line identifiers of the direct VCC, the VCC controller 13a refers to the communication information being managed by the datagram cell generator 13c and recognizes that the direct VCC has been established for the sake of communication that was being performed by the datagram VCC until now. Next, the VCC controller 13a notifies the data transfer controller 13b of the change in the output VCC and delivers the line identifiers of the direct VCC. The data transfer controller 13b thenceforth forms data, which is received from a higher layer, into cells and then sends the cells to an exchange upon attaching the line identifiers of the direct VCC to the cell headers (step 408). Further, the datagram cell generator 13c cancels the assignment of the above-mentioned datagram VCC that was being managed and sends the exchange a datagram cell (the communication-end notification cell), which gives notification of the end of communication based upon the above-mentioned datagram VCC (step 409) As a result, the datagram VCC (within the network) that had been assigned to connectionless communication is restored to the not-in-use state, after which it becomes possible for this datagram VCC to be used for communication between other terminals (step 410).

(g-5) Direct VCC Establishment and Communication Control Based Upon Increase in Communication Persistence The foregoing is for a case where an ATM terminal has caused as increase in requested bandwidth in the network. However, there is also a case where communication persistence (duration of communication) increases owing to an increase in the quantity of transmitted data. In such case also control can be performed so as to carry out communication by establishing a direct VCC.

FIG. 22 is a flowchart of communication control in a case where communication persistence (duration of communication) is increased.

Upon being notified of an increase in communication persistence by a datagram cell (request-change cell), i.e., upon detecting an increase in communication persistence (duration of communication) by referring to the VCC table 22c (step 501), the VCC establishing agent 23 compares the duration of communication with a preset threshold value (step 502) and terminates communication if the duration is less than the threshold value. If the duration of communication is equal to or greater than the threshold value, however, then the VCC establishing agent 23 executes processing identical with that of steps 404~410 of FIG. 20 and performs communication control based upon a direct VCC. As a result, communication which continues of an extended period of time can be performed by the direct VCC and it is possible to prevent a deficiency in standby datagram VCCs.

(g-6) Control for Requesting Establishment of VCC

If bandwidth cannot be assured by the datagram VCC (VCC3) between the exchanges EX1 and EX2, then, in accordance with the above-described control for establishing a direct VCC (see FIG. 18), the exchange EX1 sends the network management center NMC a request to establish the direct VCC between the terminals A and C. However, in a case where bandwidth cannot be assured also with the lines between the exchanges EX2 and EX3 and between the exchanges EX3 and EX4, a problem which arises is that the exchanges EX2 and EX3 also issue requests for direct establishment of a direct VCC between the terminals A and C simultaneously.

Figure 23A:
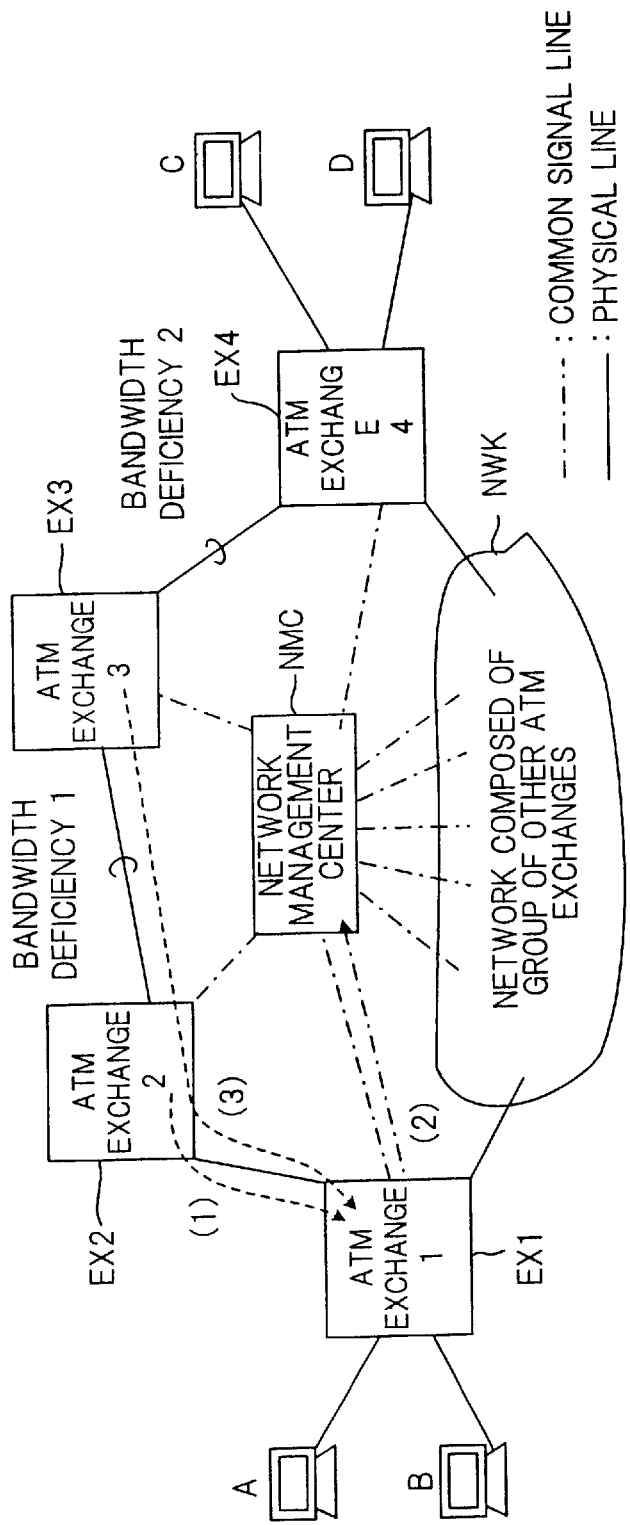
FIG. 23A is a diagram showing the configuration of a network useful in describing control for requesting establishment of a VCC.
Figure 23B:
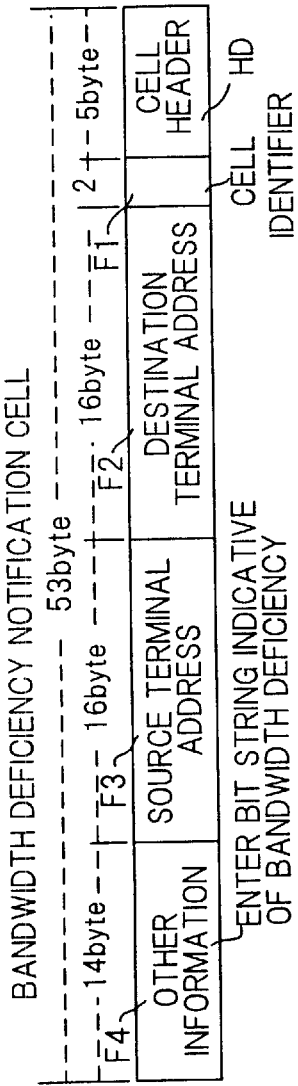
FIG. 23B is a diagram useful in describing the structure of cell which notifies of inadequate bandwidth.

According, it is so arranged that if the exchanges EX2~EX4, which do not directly accommodate the originating terminal, cannot acquire bandwidth, then a request to establish a direct VCC is not sent to the network management center NMC. Rather, as shown in FIG. 23A, the exchanges EX2~EX4 send the exchange EX1, which directly accommodates the originating terminal A, a datagram cell (bandwidth deficiency notification cell) which notifies the exchange EX1 of the fact that bandwidth cannot be assured. As shown in FIG. 23B, the bandwidth deficiency notification cell is distinguished from other cells by inserting a unique bit string, which indicates insufficient bandwidth, in the F4 field of the cell payload.

More specifically, the operation performed is as follows:

(1) The exchange EX2 managing a bandwidth deficiency 1 sends the exchange EX1 a bandwidth deficiency notification cell to notify it of the fact that bandwidth is insufficient.

(2) Upon receiving the datagram cell (the bandwidth deficiency notification cell) from the exchange EX2 notifying of the bandwidth shortfall, the exchange EX1 sends the network management center NMC a request for establishing a direct VCC between the terminals A and C.

(3) The exchange EX3 managing a bandwidth deficiency 2 also sends the exchange EX1 a bandwidth deficiency notification cell to notify it of the fact that bandwidth is insufficient . However, since the request to establish the direct VCC between the terminals A and C has already been sent at step (2) above, the exchange EX1 does not take any action in response to the bandwidth deficiency notification cell from the exchange EX3. Further, the exchange EX2, which has received the bandwidth deficiency notification cell sent from the exchange EX3 to notify of the bandwidth shortfall, does not take any action because it does not directly accommodate the originating terminal A.

If this expedient is adopted, the exchange that sends the network management center NMC the request to establish the direct VCC can be limited solely to the exchange EX1 directly accommodating the originating terminal this makes it possible to avoid duplication of direct VCC establishment requests.

Figure 24:
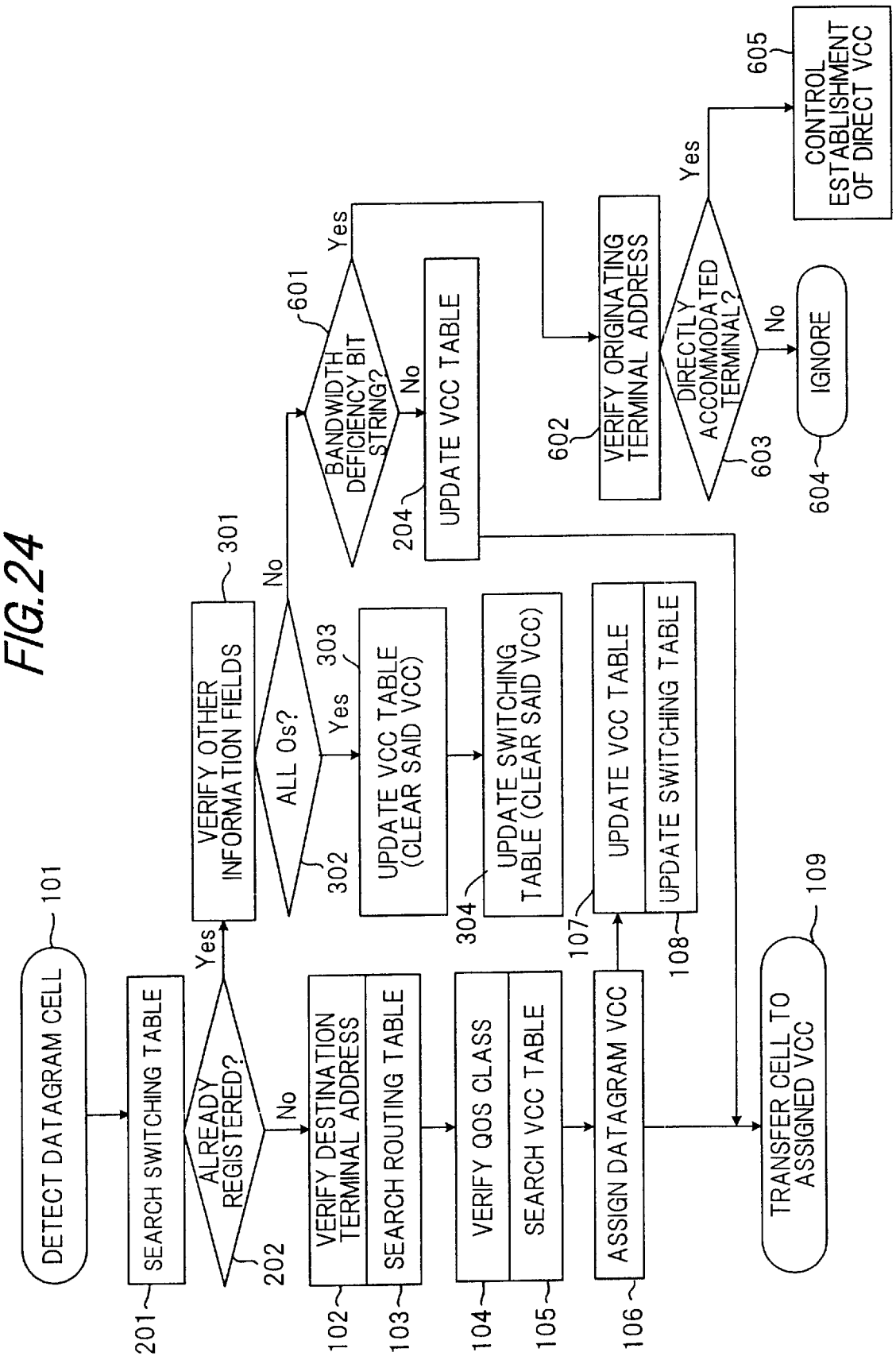
FIG. 24 is a flowchart of processing executed by an exchange to request establishment of a VCC.

FIG. 24 is a flowchart of processing, inclusive of processing to request establishment of a VCC, executed by an exchange.

If a datagram cell having the prescribed cell identifier is detected (step 101), the exchange searches the switching table 21b (step 201) and determines whether a datagram VCC on which the cell arrived has already been registered (step 202). If the datagram VCC on which the cell arrived has not been registered in the switching table 21b, this means that the arriving cell is the leading cell and, hence, the control (steps 102~109) described above with reference FIG. 7 is executed.

If it is found at step 202 that the datagram VCC on which the cell arrived has been registered in the switching table 21b, on the other hand, then the exchange refers to the F4 field of this cell to determine whether the content of this field is all 0s (steps 301, 302). If the content of this field is all 0s, this means that the arriving cell is the communication-end notification cell. Accordingly, the exchange updates the VCC table 22c. More specifically, the exchange clears the data conforming to the datagram VCC used thus far (step 303) and updates the content of the switching table 21b. That is, the correspondence between the line identifiers of the input datagram VCC and the line identifiers of the output datagram VCC is deleted from the switching table 21b by the exchange (step 304). Further, the exchange sends the communication-end notification cell to the next terminal along the route.

If it is found at step 302 that the content of the F4 field is not all 0s, this means that the arriving cell is the request-change cell or bandwidth deficiency notification cell. Accordingly, the exchange determines whether the content of the F4 field is the bit string indicative of insufficient bandwidth (step 601). If the content is not the bit string indicative of insufficient bandwidth, then the cell is the request-change cell and the exchange therefore updates the necessary bandwidth, necessary QOS and communication persistence of the VCC table 22c based upon the request indicated by the request-change cell. The exchange then executes bandwidth and QOS optimization processing so as to satisfy the new request (step 204).

If it is found at step 601 that the content of the F4 field is the bit string indicative of the shortfall in bandwidth, this means that the cell is the bandwidth deficiency notification cell. Consequently, the exchange reads the source terminal address of the bandwidth deficiency notification cell and determines whether it itself is directly accommodating the terminal indicated by this address (steps 602, 603). If the terminal is not one directly accommodated, then the exchange ignores the bandwidth deficiency notification cell (step 604). If the originating terminal is being directly accommodated, on the other hand, then the exchange executes the processing (VCC establishment control) from step 404 onward in FIG. 20 (step 605).

(h) Multicast Communication

When multicast communication is performed in a datagram network based upon a one-to-one communication protocol such as the conventional TCP/IP, a terminal must repeat the same communication procedure a number of times equivalent to the number of communication partners and must send data to each of these partners. However, this increases the load upon the terminal sending the information and the necessary bandwidth of the network in proportion to the number of terminals of the other parties.

Accordingly, the present invention is such that when multicast communication is performed, the terminal that is the source of a transmission need only send the data one time regardless of the number of communication partners. Moreover, according to the present invention, data is copied at an exchange where the route branches to each communication partner and the copied data is transmitted to the terminals of this exchange. This lightens terminal load and suppresses and constrains the necessary bandwidth of the network.

FIGS. 25A and 25B are diagrams useful in describing such multicast communication and illustrate a case in which data is multicast from terminal A to terminals C, D via the exchanges EX1~EX4. FIG. 25A shows multicast communication according to the prior art and FIG. 25B multicast communication according to the method of the present invention. With conventional multicast communication, terminal A must send the same data to terminals C and D, as illustrated in FIG. 25A. By contrast, the method of the present invention is such that if terminal A sends data only once, the exchange EX4 will copy the data and transmit the copied data to each of the terminals C and D. This lightens the load on the originating terminal and constrains the necessary bandwidth of the network.

In order to make the above-described multicast communication according to the invention possible, the addresses of a plurality of communicating partner terminals must be specified by the datagram cell (the leading cell). Higher layer protocols include protocols having group addresses for multicasting, as in the manner of group IP addresses. If such a higher layer protocol is available, all multicast communicating partner terminals can be specified by a single address by describing a group address as the group address of a group of communicating partner terminals of a datagram cell.

However, in a case where data of a protocol not having a group address is transmitted, only the addresses of the individual terminals may be used. That is, only the address of one communicating partner terminal can be specified by one datagram cell (leading cell). Accordingly, in a case where multicast communication is performed, the originating terminal that sends the data sends datagram cells (leading cells) the number of which is equivalent to the number of communicating partner terminals, thereby designating the addresses of a plurality of communicating partner terminals.

Figure 26:
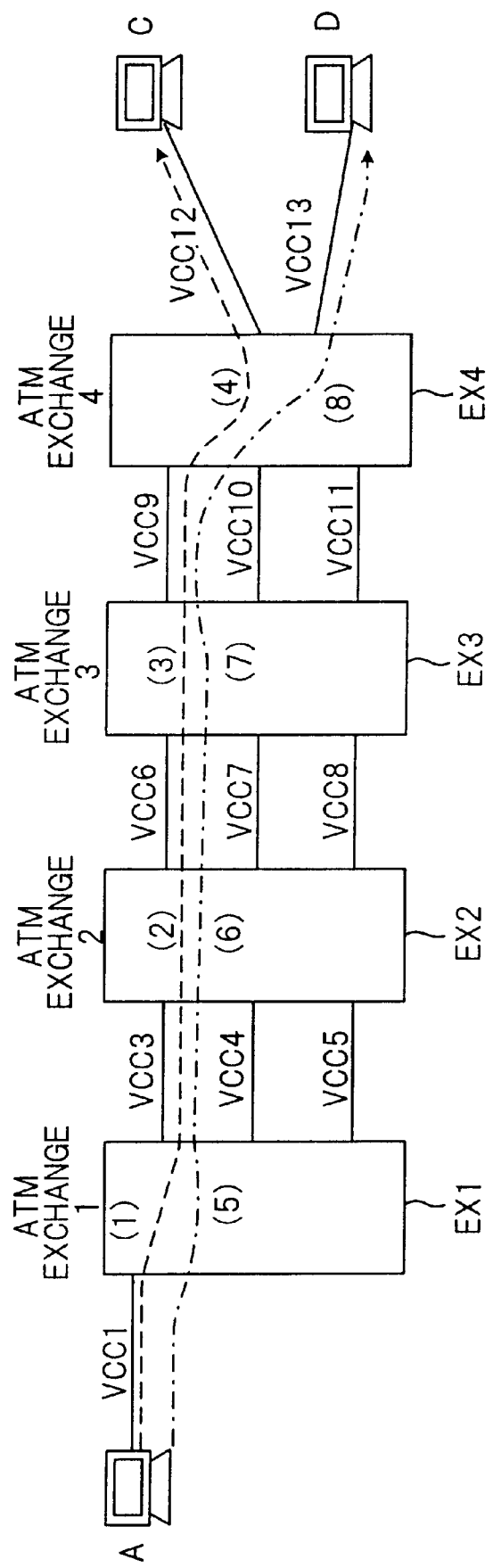
FIG. 26 is a diagram useful in describing control for specifying the terminals of parties involved in multicast communication.

FIG. 26 is a diagram useful in describing control for specifying the terminals of parties involved in multicast communication, FIGS. 27A, 27B and 27C are diagrams useful in describing the content of switching tables of exchanges, and FIGS. 28A, 28B and 28C are diagrams useful in describing the content of a VCC table of datagram VCCs addressed from exchange EX1 to exchange EX2.

In a case where terminal A is to communicate with terminals C and D by multicast communication, first terminal A sends the exchange EX1 a datagram cell (leading cell) addressed to terminal C.

(1) Upon receiving the leading cell addressed to terminal C, the exchange EX1 judges that the switching destination is the exchange EX2, assigns VCC3 as the datagram VCC and registers "VCC1–VCC3", which indicates the correspondence between the input datagram VCC and the output datagram VCC, in the switching table 21*b* (see FIG. 27A). In actuality, VCC1, VCC3 are specified by line identifiers VPI/VCI, which have been set for these VCCs in advance. Further, the exchange EX1 updates the VCC table 22*c* from the content shown in FIG. 28A to the content shown in FIG. 28B by the assignment of the datagram VCC. At this stage, however, the destination is still the terminal C.

(2) Similarly, upon receiving the leading cell addressed to terminal C, the exchange EX2 judges that the switching destination is the exchange EX3, assigns VCC6 as the datagram VCC and registers "VCC3–VCC6", which indicates the correspondence between the input datagram VCC and the output datagram VCC, in the switching table 21*b*.

(3) Similarly, upon receiving the leading cell addressed to terminal C, the exchange EX3 judges that the switching destination is the exchange EX4, assigns VCC9 as the datagram VCC and registers "VCC6–VCC9", which indicates the correspondence between the input datagram VCC and the output datagram VCC, in the switching table 21*b*.

(4) Similarly, upon receiving the leading cell addressed to terminal C, the exchange EX4 judges that the switching destination is the terminal C, assigns VCC12 as the datagram VCC and registers "VCC9–VCC12", which indicates the correspondence between the input datagram VCC and the output datagram VCC, in the switching table (see FIG. 27B).

Next, terminal A sends the exchange EX1 a leading cell addressed to terminal D.

(5) Upon receiving the leading cell addressed to terminal D, the exchange EX1 verifies that the switching destination is the exchange EX2, which is no change from the previous switching destination, and does not assign a datagram VCC anew. However, the exchange EX1 enters terminal D in the destination field of the VCC table 22*c* (see FIG. 28C). It should be noted that the set bandwidths of VCC4 and VCC5 become 1.0 M and 0.5 M, respectively, owing to bandwidth optimization processing.

(6) Similarly, upon receiving the leading cell addressed to terminal D, the exchange EX2 verifies that the switching destination is the exchange EX3, which is no different from the previous switching destination, and does not assign a datagram VCC anew.

(7) Similarly, upon receiving the leading cell addressed to terminal D, the exchange EX3 verifies that the switching destination is the exchange EX4, which is no different from the previous switching destination, and does not assign a datagram VCC anew.

(8) Upon receiving the leading cell of terminal D, the exchange EX4 verifies that the switching destination is terminal D, which represents a change from the previous destination, newly assigns VCC13 as the datagram VCC and adds "VCC9–VCC13" to the switching table (see FIG. 27C).

Thus, an exchange that has received a leading cell from an input datagram VCC that has been registered in the switching table 21b newly assigns an output datagram VCC and adds it to the switching table 21b only in a case where the switching destination has changed. As a result, in the case of FIG. 26, the exchange 4 is capable of copying the data and of transmitting the copied data to each of the terminals C and D.

Figure 29:
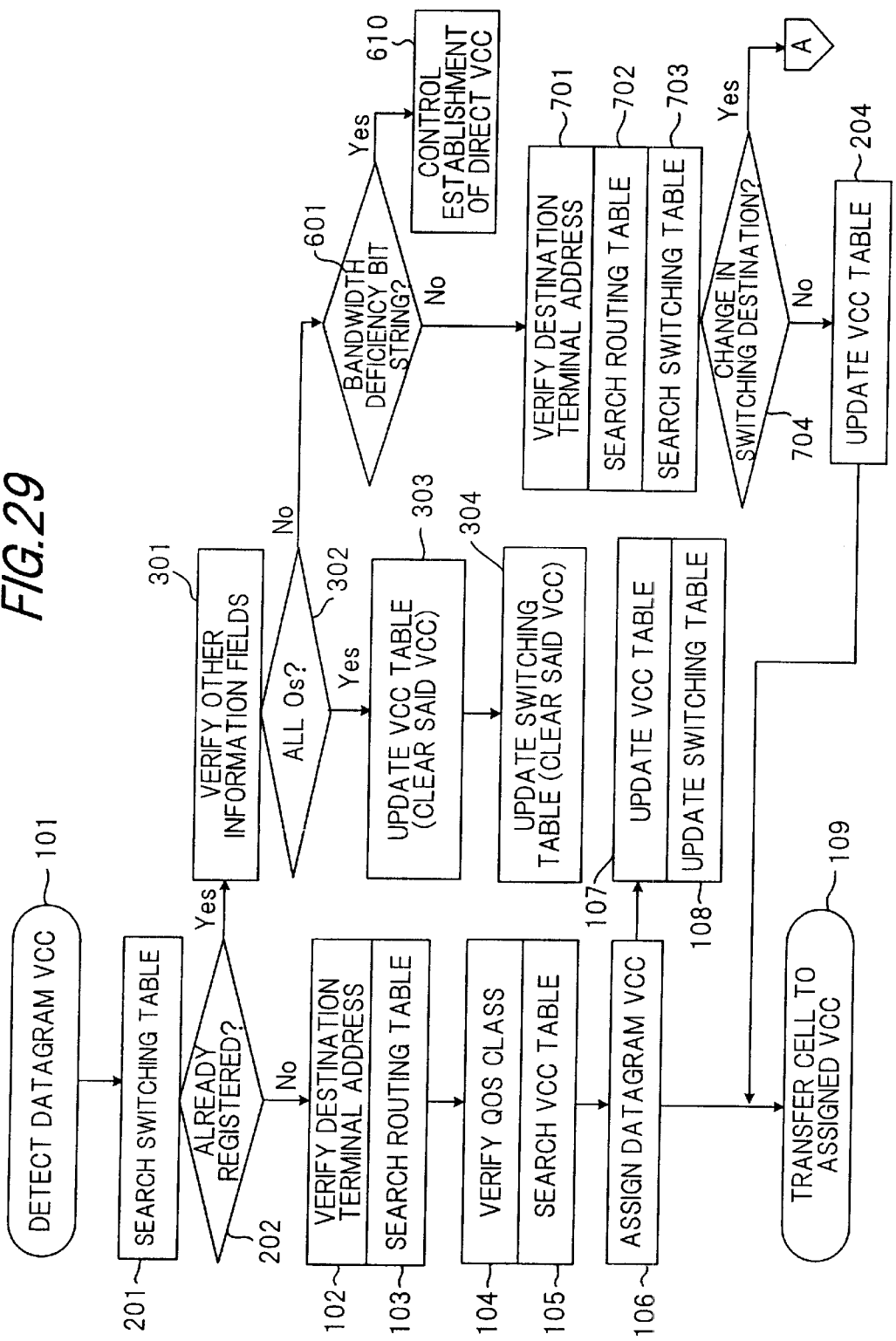
FIG. 29 is the first part of a flowchart of exchange control inclusive of multicast processing.
Figure 30:
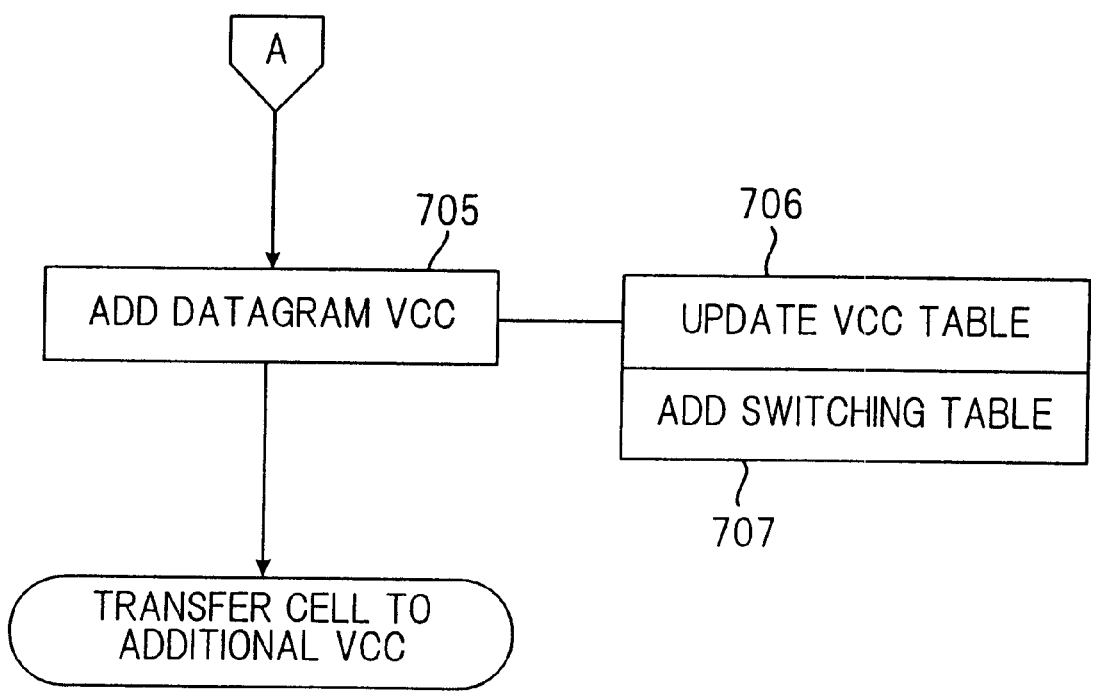
FIG. 30 is the second art of the flowchart of exchange control inclusive of multicast processing.
Figure 31A:
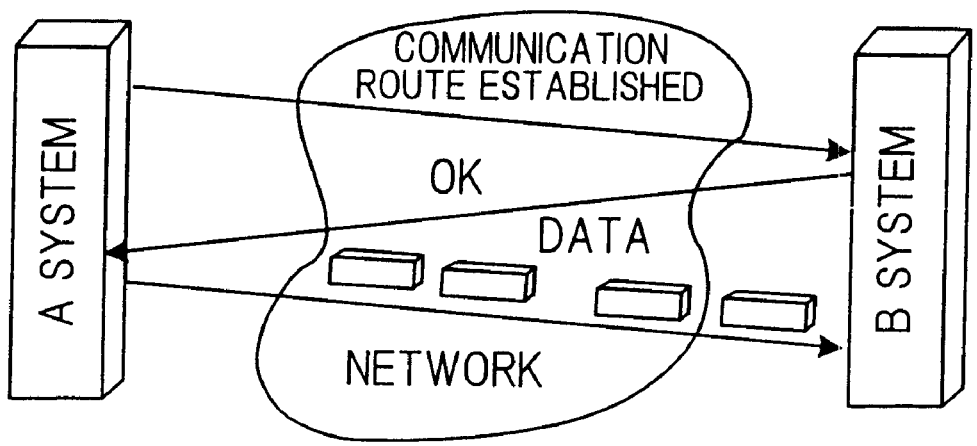
FIGS. 31A and 31B are diagrams useful in describing connection-oriented communication and connectionless communication according to the prior art.
Figure 31B:
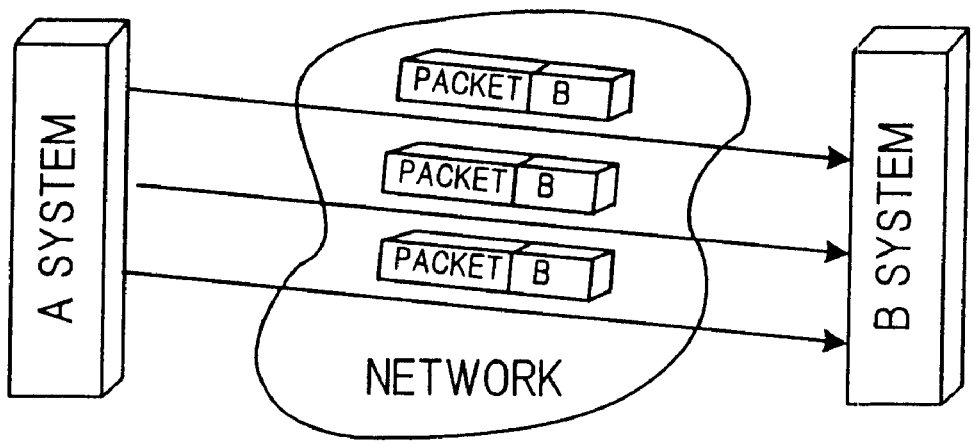
Figure 33:
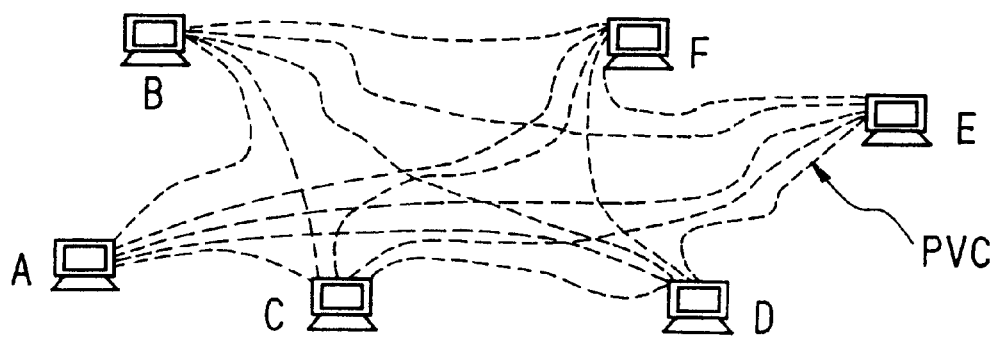
FIG. 33 is a diagram useful in describing the PVC technique according to the prior art.
Figure 34:
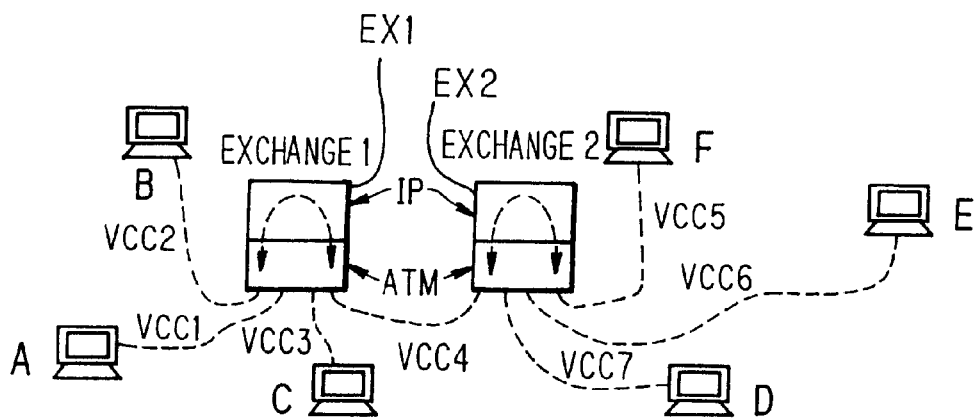
FIG. 34 is a diagram useful in describing the datagram technique according to the prior art.

FIGS. 29 and 30 are flowcharts of control, inclusive of multicast processing, performed by an exchange.

If a datagram cell having the prescribed cell identifier is detected (step 101), the exchange searches the switching table 21b (step 201) and determines whether a datagram VCC on which the cell arrived has already been registered (step 202). If the datagram VCC on which the cell arrived has not been registered in the switching table 21b, this means that the arriving cell is the leading cell and, hence, the control (steps 102~109) described above with reference FIG. 7 is executed.

If it is found at step 202 that the datagram VCC on which the cell arrived has already been registered in the switching table 21b, on the other hand, then the exchange refers to the F4 field of this cell to determine whether the content of this field is all 0s (steps 301, 302). If the content of this field is all 0s, this means that the arriving cell is the communication-end notification cell. Accordingly, communication termination processing is executed (steps 303, 304).

If it is found at step 302 that the content of the F4 field is not all 0s, then the exchange determines whether the content of the F4 field agrees with the bit string indicative of insufficient bandwidth (step 601). If the content of the F4 field is the bit string indicative of insufficient bandwidth, then the exchange executes VCC establishment control by the processing of steps 602 onward shown in FIG. 24 (step 610).

If it is found at step 601 that the content of the F4 field does not agree with the bit string indicative of insufficient bandwidth, then the exchange reads the destination terminal address contained in the received cell, searches the routing table 22b based upon this address and finds the exchange that is the switching destination (steps 701, 702). The exchange thenceforth determines the exchange that is the destination of switching from the corresponding relationship between input VCC and output VCC registered in the switching table 21b (step 703). The exchange then checks to see whether the exchange that is the destination of switching obtained at step S702 is contained in the exchange that is the switching destination obtained at step S703. In other words, the exchanges determines whether the switching destination is a new switching destination (step 704).

If the switching destination is not a new switching destination, this means that the received cell is the request-change cell and therefore the exchange updates the necessary bandwidth, necessary QOS and communication persistence of the VCC table 22c based upon the request indicated by the request-change cell. The exchange then executes bandwidth and QOS optimization processing so as to satisfy the new request (step 204).

If the switching destination is a new switching destination, that is, if the switching destination has changed, this means that the received cell is a partner terminal notification cell for multicast communication purposes. Accordingly, the terminal assigns a new VCC as the datagram VCC (step 705), subsequently updates the content of the VCC table (step 706) and stores the new VCC in the switching table (step 707). The exchange then sends the cell to the newly added datagram VCC.

Thus, in accordance with the present invention, a plurality of datagram VCCs for connectionless communication for the purpose of delivering data between exchanges are prepared in advance and exclusive connections are supplied one at a time for individual connectionless communications (datagram communications). As a result, each individual terminal can be assured a bandwidth and quality for the sending of data.

In accordance with the present invention, a connection-oriented communication exchange, e.g., an ATM exchange, need not assemble cells into an IP packet, thus making it possible to perform connectionless communication utilizing fully the high-speed switching characteristic of an ATM exchange.

In accordance with the present invention, a protocol identifier, which identifies which protocol address is specified by a destination terminal address, is included in a leading cell so that an exchange is capable of identifying, by referring to the protocol identifier, which protocol address is specified by the terminal address indicated by the leading cell, As a result, not only the Internet Protocol but various other higher layer protocols can be supported.

In accordance with the present invention, data indicating bandwidth or QOS class required for connectionless communication is included in the leading cell, and an exchange is made to manage, by a VCC table, in-use/not-in-use state of each datagram VCC and bandwidths or QOS classes set for datagram VCCs. As a result, an exchange can, by referring to the VCC table, readily assign a datagram VCC satisfying the necessary bandwidth or QOS class indicated by the leading cell.

In accordance with the present invention, communication can be started even in a case where a datagram VCC that satisfies the necessary bandwidth or QOS class requested by a terminal does not exist. Moreover, communication that does satisfy the requirements of the terminal can be performed after communication starts.

In accordance with the present invention, it is so arranged that if a request-change cell has been received, the exchange, rather than executing routing processing, executes only processing for altering the set bandwidth of the already assigned datagram VCC to the necessary bandwidth. As a result, the burden on the exchange is alleviated because the exchange need not execute routing processing. Moreover, communication that satisfies requirements after a change can be performed.

In accordance with the present invention, it is so arranged that when connectionless communication using a datagram VCC ends, the terminal sends an exchange a communication-end notification cell indicative of end of communication, and the exchange responds to receipt of the communication-end notification cell by restoring the assigned datagram VCC to the not-in-use state. As a result, a datagram VCC can be utilized again for another connectionless communication.

In accordance with the present invention, it is so arranged that if a physical line does not have enough surplus bandwidth for increasing the set bandwidth of a datagram VCC to a necessary bandwidth when there has been a change in necessary bandwidth or QOS class during the course of communication, a direct VCC between terminals is established to perform communication. This makes possible communication that positively satisfies requirements after a change.

In accordance with the present invention, data indicating communication persistence is included in the leading cell. If communication persistence exceeds a predetermined threshold value, a direct VCC between terminals is established to perform communication. As a result, it is possible to prevent lack of datagram VCCs in order to perform communication that continues over an extended period of time.

In accordance with the present invention, an exchange which sends a network management center a request to establish a direct VCC is made the exchange directly accommodating the originating terminal. As a result, only one exchange requests the network management center to establish a direct VCC, thus making it possible to avoid duplication of direct VCC establishment requests.

In accordance with the present invention, it is so arranged that user cells are sent to a branch point via a common path, the user cells are copied at the branch point and the copied cells are distributed to a plurality of communication devices belonging to other parties. In multicast communication, therefore, the load on the originating terminal can be alleviated since this terminal need only send the user cell stream one time. Moreover, an increase in traffic can be suppressed.

As many apparently widely different embodiments of the present invention can be made without departing from the spirit and scope thereof, it is to be understood that the invention is not limited to the specific embodiments thereof except as defined in the appended claims.

What is claimed is:

1. A connectionless communication method for connectionless transmission of data, comprising the steps of:

establishing a plurality of virtual channel connections, each of which is exclusively for connectionless transfer of data, between mutually adjacent exchanges beforehand;

disassembling connectionless data into data cells in a terminal;

inserting a leading cell, which indicates a destination terminal address of a terminal that is the destination of the data, at the head of the data cells and making a line identifier of the leading cell identical with line identifiers of the data cells in the terminal;

sending the leading cell from the terminal to an exchange prior to the data cells;

in the exchange, assigning a prescribed virtual channel connection exclusively for communication of said connectionless data upon referring to the destination terminal address contained in the leading cell;

transmitting data cells, which have the line identifier identical with that of the leading cell, from the exchange toward the destination terminal, using the virtual channel connection that has been assigned;

storing correspondence between the line identifier of the leading cell and the line identifier of the assigned virtual channel connection in a switching table which is provided in the exchange;

inserting, into the leading cell, data indicating a necessary bandwidth or necessary quality of communication class required for connectionless communication;

providing an exchange with a virtual channel connection table for managing the virtual channel connections set in advance for connectionless communication; and in the exchange, managing through use of the virtual channel connection table, in-use/not-in-use state of each virtual channel connection and bandwidths or quality of service classes set for the virtual channel connections, referring to the virtual channel connection table to select a virtual channel connection optimum for the necessary bandwidth or necessary quality of service class indicated by the leading cell, and assigning this virtual channel connection for connectionless communication, wherein the exchange refers to the switching table to transmit, using the assigned virtual channel connection, data cells having the line identifier identical with that of the leading cell.

2. The method according to claim 1, wherein in a case where the terminal performs connection-oriented communication, the terminal sends a signaling cell to request establishment of a connection, attaches line identifier, which has been specified in response to the request, to data cells and sends the data cells; and in a case where the terminal performs connectionless communication, the terminal attaches line identifier of a virtual channel connection, which has been established between the terminal and an exchange beforehand, to the leading cell and sends the leading cell to the exchange, thereafter attaches the same line identifier as the abovementioned line identifier to the data cells and sends the data cells to the exchange.

3. The method according to claim 1, wherein the leading cell has an identifier which indicates that the cell is the leading cell, and the exchange identifies the leading cell by this identifier.

4. The method according to claim 1, wherein the leading cell has a protocol identifier for identifying which protocol address is specified by a destination terminal address; and the exchange refers to the protocol identifier to judge which protocol address is specified by the terminal address indicated by the leading cell.

5. The method according to claim 1, further comprising the following steps in a case where a virtual channel connection that satisfies the necessary band or necessary quality of service class required by the terminal does not exist:

causing the exchange to start communication upon temporarily assigning a virtual channel connection that does not satisfy the necessary band or necessary quality of service class; and causing the exchange to raise, while communication is in progress, a set bandwidth or quality of service class of this assigned virtual channel connection to the necessary bandwidth or necessary quality of service class required by the terminal.

6. The method according to claim 5, further comprising the following step in a case where a physical line in which the temporarily assigned virtual channel connection exists does not possess enough surplus bandwidth to raise the set bandwidth of the virtual channel connection to the necessary bandwidth:

causing the exchange to determine whether an unused virtual channel connection exists in this physical line and, if such a virtual channel connection exists, to reduce the set bandwidth of the unused virtual channel connection and increase the set bandwidth of the temporarily assigned virtual channel, connection.

7. The method according to claim 5, further comprising the following steps of:

in a case where a physical line in which an assigned virtual channel connection exists does not possess enough surplus bandwidth to increase the set bandwidth of the virtual channel connection, sending a request for establishment of a direct virtual channel connection between an originating terminal and a destination terminal, from the exchange to a network management center; and executing communication between the terminals via a direct route different from a route based upon the ready assigned virtual channel connection.

8. The method according to claim 7, wherein the exchange is provided with a virtual channel connection establishing agent, said virtual channel connection establishing agent generates signaling data upon referring to the necessary bandwidth required by the terminal, entered in the virtual channel connection table, sends the signaling data to the network management center and requests, instead of the terminal, establishment of a direct virtual channel connection between the terminals.

9. The method according to claim 7, wherein when the originating terminal has received line identifier of a direct virtual channel connection from the network management center, the terminal attaches these line identifier to cells, sends the cells to the exchange and notifies the exchange, by a communication-end notification cell, of end of communication based upon the virtual channel connection allocated thus far.

10. The method according to claim 7, wherein the exchange that has sent the network communication center the request for establishing a direct virtual channel connection is made an exchange directly accommodating the originating terminal, and an exchange located along a route sends the exchange directly accommodating the originating terminal a bandwidth deficiency notification cell indicative of insufficient bandwidth.

11. The method according to claim 1, further comprising the following step of:

when the necessary bandwidth or necessary quality of service class has changed during communication using the assigned virtual channel connection, sending a request-change cell to the exchange from the terminal to notify the exchange of the change in necessary bandwidth or necessary quality of service class.

12. The method according to claim 11, further comprising the following steps of:

when the exchange has received a leading cell or a request-change cell from the terminal, distinguishing between the leading cell and the request-change cell by verifying whether line identifiers of the cell have been stored in the switching table; and in a case where the request-change cell has been received, refraining from executing routing processing and executing processing for changing the set bandwidth of an already assigned virtual channel connection to the necessary bandwidth.

13. The method according to claim 1, further comprising the steps of:

sending a communication-end notification cell from the terminal to the exchange when connectionless communication has ended; and causing the exchange to restore the assigned virtual channel connection to a not-in-use state in response to receipt of the communication-end notification cell.

14. The method according to claim 1, further comprising the steps of:

inserting data, which is indicative of persistence of communication, in the leading cell;

managing persistence of communication of each virtual channel connection by the virtual channel connection table and, if the persistence of communication of a prescribed virtual channel connection exceeds a threshold value, causing the exchange to request a network management center to establish a direct virtual channel connection between an originating terminal and a destination terminal; and executing communication between the terminals via a direct route different from a route based upon the already assigned virtual channel connection,.

15. The method according to claim 1, further comprising a step of continuously sending leading cells, the number of which is equivalent to the number of destination terminals of other parties, from an originating terminal in a case where multicast communication is performed.

16. The method according to claim 1, further comprising the steps of:

continuously sending leading cells, the number of which is equivalent to the number of destination terminals of other parties, from an originating terminal in a case where multicast communication is performed;

causing the exchange, which has received a leading cell, to obtain a switching destination by referring to a destination terminal address that has been inserted into the leading cell, to judge whether the switching destination has duplicated a prevailing multicast switching destination and, if the switching destination is not duplicated, to assign a prescribed virtual channel connection; and registering correspondence between the line identifier of the leading cell and the line identifier of the assigned virtual channel connection in a switching table.

* * * * *